(12) United States Patent
Reddy et al.

(10) Patent No.: US 12,047,674 B2
(45) Date of Patent: Jul. 23, 2024

(54) SYSTEM FOR GENERATING A THREE-DIMENSIONAL SCENE OF A PHYSICAL ENVIRONMENT

(71) Applicant: Occipital, Inc., Boulder, CO (US)

(72) Inventors: Vikas M. Reddy, Boulder, CO (US); Jeffrey Roger Powers, San Francisco, CA (US); Anton Yakubenko, Boulder, CO (US); Gleb Krivovyaz, Moscow (RU); Yury Berdnikov, Moscow (RU); George Evmenov, Moscow (RU); Timur Ibadov, Odintsovo (RU); Oleg Kazmin, Moscow Region (RU); Ivan Malin, Moscow (RU); Yuping Lin, San Jose, CA (US)

(73) Assignee: Occipital, Inc., Boulder, CO (US)

( * ) Notice: Subject to any disclaimer, the term of this patent is extended or adjusted under 35 U.S.C. 154(b) by 0 days.

(21) Appl. No.: 18/174,737

(22) Filed: Feb. 27, 2023

(65) Prior Publication Data

US 2023/0224576 A1 Jul. 13, 2023

Related U.S. Application Data

(63) Continuation of application No. 17/249,041, filed on Feb. 18, 2021, now Pat. No. 11,595,568.

(60) Provisional application No. 63/011,409, filed on Apr. 17, 2020, provisional application No. 62/977,786, filed on Feb. 18, 2020.

(51) Int. Cl.
*H04N 23/60* (2023.01)
*G01P 13/00* (2006.01)
*G06T 7/20* (2017.01)
*G06T 7/55* (2017.01)
*G06T 17/00* (2006.01)
*H04N 23/63* (2023.01)

(52) U.S. Cl.
CPC ............. *H04N 23/64* (2023.01); *G01P 13/00* (2013.01); *G06T 7/20* (2013.01); *G06T 7/55* (2017.01); *G06T 17/00* (2013.01); *H04N 23/635* (2023.01); *G06T 2207/10028* (2013.01)

(58) Field of Classification Search
None
See application file for complete search history.

(56) References Cited

U.S. PATENT DOCUMENTS

| 9,304,003 | B1 | 4/2016 | Ashman |
| 9,607,315 | B1* | 3/2017 | Worley, III ........ G06Q 30/0252 |
| 2013/0331067 | A1* | 12/2013 | Coussemaeker .. H04M 1/72454 455/412.2 |
| 2015/0125045 | A1 | 5/2015 | Gauglitz |
| 2016/0134860 | A1 | 5/2016 | Jovanovic |
| 2017/0337690 | A1 | 11/2017 | Arth |
| 2018/0348854 | A1 | 12/2018 | Powers |
| 2021/0082137 | A1 | 3/2021 | Wang |
| 2021/0258476 | A1 | 8/2021 | Reddy et al. |

* cited by examiner

*Primary Examiner* — Frank S Chen
(74) *Attorney, Agent, or Firm* — Lee & Hayes, P.C.

(57) ABSTRACT

A system configured to assist a user in scanning a physical environment in order to generate a three-dimensional scan or model. In some cases, the system may include an interface to assist the user in capturing data usable to determine a scale or depth of the physical environment and to perform a scan in a manner that minimizes gaps.

20 Claims, 17 Drawing Sheets

700

```
┌─────────────────────────────────────────────┐
│ PRESENT AN OPAQUE THREE-DIMENSIONAL SHAPE ON A DISPLAY OF │
│ A CAPTURE DEVICE REPRESENTING AN UNSCANNED PORTION OF A │
│ PHYSICAL ENVIRONMENT │
│ 702 │
└─────────────────────────────────────────────┘
                    │
                    ▼
┌─────────────────────────────────────────────┐
│ GENERATE FIRST IMAGE DATA AS THE CAPTURE DEVICE IS MOVED │
│ WITHIN THE PHYSICAL ENVIRONMENT │
│ 704 │
└─────────────────────────────────────────────┘
                    │
                    ▼
┌─────────────────────────────────────────────┐
│ DETERMINE A FIRST REGION OF THE PHYSICAL ENVIRONMENT │
│ ASSOCIATED WITH THE IMAGE DATA │
│ 706 │
└─────────────────────────────────────────────┘
                    │
                    ▼
┌─────────────────────────────────────────────┐
│ REPLACE A SECOND REGION OF THE OPAQUE THREE-DIMENSIONAL │
│ SHAPE WITH A PORTION OF THE IMAGE DATA, THE SECOND REGION │
│ SMALLER THAN THE FIRST REGION │
│ 708 │
└─────────────────────────────────────────────┘
                    │
                    ▼
┌─────────────────────────────────────────────┐
│ DETERMINE IF THE SCAN IS COMPLETE │
│ 710 │
└─────────────────────────────────────────────┘
```

FIG. 7

SYSTEM FOR GENERATING A THREE-DIMENSIONAL SCENE OF A PHYSICAL ENVIRONMENT

CROSS-REFERENCE TO RELATED APPLICATIONS

This application is a continuation of and claims priority to U.S. application Ser. No. 17/249,041, Feb. 18, 2021 and entitled "System For Generating a Three-Dimensional Scene of a Physical Environment," which claims priority to U.S. Provisional Application Nos. 62/977,786 filed on Feb. 18, 2020 and entitled "System for Generating Three-Dimensional Virtual Environments Using Spherical Capture" and 63/011,409 filed on Apr. 17, 2020 and entitled "System and Application for Capture and Generation of Three-Dimensional Scene," which are incorporated herein by reference in their entirety.

BACKGROUND

The presence of three dimensional (3D) imaging and virtual reality systems in today's world is becoming more and more common. In some cases, the imaging system or virtual reality system may be configured to allow a user to interact with a three-dimensional virtual scene of a physical environmental. In some case, the users may capture or scan the physical environment in a complete manner to generate the three-dimensional virtual scene. However, users often miss or leave gaps during scanning sessions resulting in an incomplete virtual scene.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

FIG. 7 is another example flow diagram showing an illustrative process for providing a guided scan of a physical environment according to some implementations.

DETAILED DESCRIPTION

Figure 1:
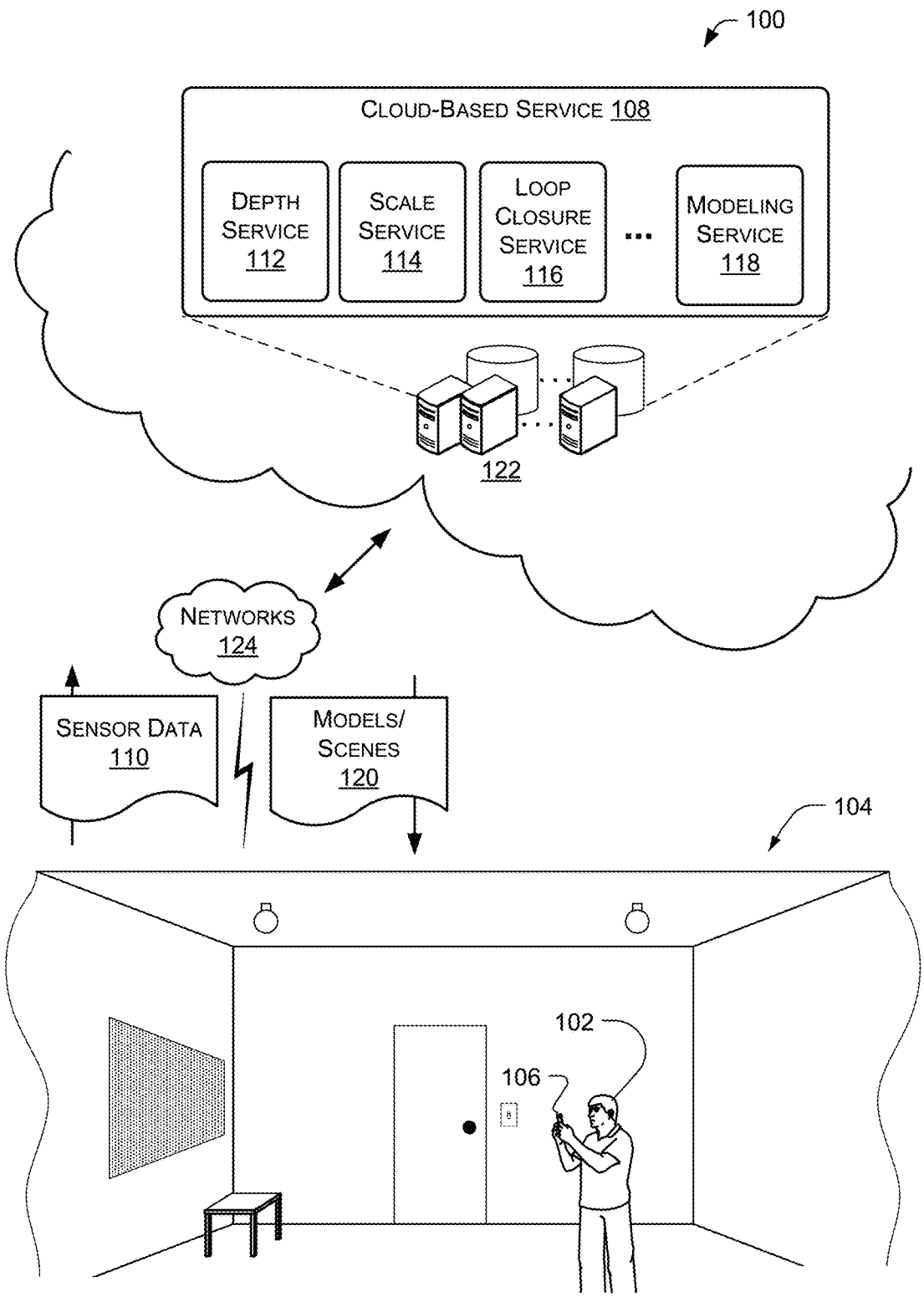
FIG. 1 illustrates an example of a user scanning a physical environment with a capture device and associated cloud-based service according to some implementations.

This disclosure includes techniques and implementations for assisting a user in capturing sensor data (e.g., image data) of a physical environment and generating a three-dimensional scene or model representative of the physical environment based at least in part on the sensor data. In some cases, precise modeling of a physical environment as a virtual scene or model is desirable. Conventional systems typically request the user to scan the physical environment in an exploratory manner that requires an extended length of time and multiple overlapping scans of the same portion of the physical environment. However, the system, discussed herein, allows the user to generate a three-dimensional model of a physical environment (such as a room) using a guided spherical capture or scanning process in a relatively short period of time.

In some cases, the system may request a user initiate or commence a scan from a position relatively center within a room or physical environment. The system may then request the user initialize the scan and move the capture device sideways to generate a translation movement that initializes a simultaneous localization and mapping (SLAM) tracking on the capture device. In some implementations, the system may request the user select a starting position at which an object or corner is visible to the capture device during the sideways motion (or up and down motion) to capture parallax image data of the object usable to initialize the SLAM tracking. In some cases, once the user has successfully initialized the SLAM tracking, the capture device may display a success icon or other type of notification (e.g., visual, audio, tactile, etc.) to alert the user to progress to a scale initialization step.

In some implementations, the capture device may not be equipped with a depth camera or other component for determining a scale of the physical environment with respect to the capture device. In these implementations, the system, described herein, may display a progress indicator and a motion indicator as well as one or more guides to assist the user in initializing scale without the use of a depth camera. In some instances, the system may request the user to perform a motion depicted by the motion indicator (such as a circle, infinity sign, figure eight, or the like). The indicated motion may include both side to side motion and up and down motion as part of a single trajectory or movement to capture image data associated with a particular feature of the environment from different angles and to capture orientation and motion data associated with the capture device, such as inertial measurement units (IMU) data, accelerometer data, gyroscope data, or a combination thereof. In some cases, by having the user generate an expected motion over multiple axis, the system is able to calibrate or determine an accuracy of the position sensors (e.g., the IMU, accelerometer, and the like) generating the orientation data.

In some cases, the system may also display a tracking indicator and a user motion indicator. The tracking indicator may illustrate a speed and direction for the user to move the capture device along the motion indicator. The user motion indicator may illustrate the user's actual movements of the capture device, such that the user may learn to match the capture device movements to the desired trajectory and speed. The system may then determine a scale of the environment using various techniques. For example, the scale may be determined by identifying a scale that provides the best consistency between the motion of the device determined from visual data and the motion extracted from the orientation and motion data.

Once the scale is determined, the system may display another success icon or other type of notification (e.g., visual, audio, tactile, etc.) to alert the user to progress to the scan or capture step. Some implementations may also include a progress indicator that provides the user an indication of how well the system is determining the calibration of the position sensors and an idea of how much longer they should continue the indicated motion.

Once the system has initialized the SLAM operations and determined a scale of the environment, the user is ready to scan or capture the image data usable to generate the scale three-dimensional scene or model of the physical environment (e.g., a model that has a scale that is metrically close to the actual physical environment). During the scanning or capture phase, the system may display a visual indication such as an opaque three-dimensional sphere (or cylinder, cube, polygon or other three-dimensional shape) with the center being the user's or the capture device's position within the physical environment. In some implementations, the opaque object or sphere may only be partially opaque such that the object is partially transparent (e.g., 10% transparent, 20% transparent, 40% transparent, and the like).

In other examples, the visual indication may also be represented as a rendered mesh and/or as a spray or painted representation. For instance, as the accuracy of the region of the shape increases the density of the spray or paint may also increase. In other words, a fog or cloudiness of the region may become clearer as the confidence or accuracy of the scan is improved. In another example, the system may determine a three-dimensional mesh or reconstruction in substantially real time and use the mask to complete the regions.

As the user scans the environment a portion of the opaque sphere or other visual indication is completed with image data representing the physical environment. The portion of the opaque sphere completed may be smaller than the region of the physical environment captured by the sensors to further encourage the user to increase the amount of overlap between frames of the image data, thereby reducing the computational complexity associated with combing the image data into a three-dimensional model. For example, the system may more quickly and less resource intensively combine sensor data when various frames include overlapping image data. Thus, the system may reduce the area completed with respect to individual frames of the image data to encourage the user to scan in a manner that results in a desired amount of overlap.

In some examples, the scale may also be initialized using detection of known objects, such as standard door height or the like. In other cases, the users may enter a known distance (e.g., measure using a laser tool and/or tap measure) and then scan the distance or select a scanned surface and enter a length or other dimensions. In one specific example, the system may estimate an initial scale and then verify and update the scale using data captured during the scanning phase below. For example, the scale may be updated periodically, continuously, or upon detecting one or more trigger events (e.g., a predefined portion of the opaque object being completed).

In some cases, as the user scans the physical environment and/or completes the opaque sphere or other visual indication, the system may generate points and/or lines over the image data representing the physical environment and/or the opaque regions. The points and/or lines may be used to indicate objects, surfaces, and/or additional areas to scan. In some cases, the points and/or lines may also be color coded (such as red, yellow, green, and the like) to indicate a confidence or distance from the user. For example, a green line may be an edge of a surface or object with which the system is highly confident (e.g., above a first confidence threshold) regarding the edge placement while a red line may indicate an edge that the system is highly unconfident of the placement (e.g., below a second confidence threshold).

During the entirety of the scan, the system may attempt to maintain a relative position of the user (e.g., within a radius of the user's starting position). In these examples, the system may cause a display to dim or other notification to be displayed in response to the user changing position outside of the defined radius (e.g., the user has moved more than 1.0 feet, 2.0 feet, and the like from the starting position). When the user returns to the starting or original capture point the system may cause the scan to resume and the display to undim or brighten.

In some examples, the system may also apply real-time motion blur and/or rolling shutter analysis based at least in part on the orientation and motion data from, for instance, the IMU to improve the overall quality of the data presented to the user as the opaque portion of the sphere or other visual indication (such as a mesh) is completed. For example, the system may apply the motion blur and/or rolling shutter based at least in part on a speed, acceleration of rotation, translation, translation over a selected axis, depth, detect lines, current pose or other SLAM data, and the like to improve the model quality. In some cases, the system may provide the user with real-time feedback on the motion. For example, the system may cause the user to hold still, speed up, slow down, or the like to assist with maintaining image quality, SLAM tracking, and model generation.

The system may also determine a quality of the three-dimensional scene or model based at least in part on a number of detected keypoints (e.g., greater than or less than a threshold number of keypoints), number of keypoints in a frame, number of keypoint matches between current frame and a reference or prior frame (e.g., greater than or less than a threshold number of matches), number of inlier keypoints (e.g., compared to a threshold), total parallax between prior frames (e.g., greater or less than a parallax threshold), an accuracy of the pose estimation via the SLAM tracking, and the like.

In some implementations, as the user substantially completes the scan (e.g., has met or exceed a desired scanning threshold, such as 90%, 95%, 99%, etc.) the system may initialize a guided loop closure process. During the guided loop closure, the system may display a loop closure icon, such as a circle or pie shape including a missing portion or piece. The guided loop closure may assist the user by showing the user how to guide the missing portion or piece into the circle while scanning the environment. This guided process assists the user in re-scanning areas that have already been captured and rendered during the spherical capture phase to assist with loop closure. The image data captured during the guided loop closure allows the SLAM operations to generate constraints (having a confidence value greater than or equal to a desired threshold) based on features represented in image data captured at the onset of scanning and at the completion of the scanning process.

In other implementations, the system may also perform a loop closure using a local bundle adjustment process. For example, the system may utilize a user interface that includes crosshairs or other icon that should be aligned (e.g., the user moves the capture device to align the icons on the display). In other examples, the system may utilize a number or plurality of targets that the user has to align the crosshair with, such that the user makes several alignment motions. In one specific example, the loop closure may perform a five degree of freedom optimization using a two-dimension to two-dimension matches (e.g., keypoint or feature point) to obtain isometry up to scale. In some cases, the five degree of freedom optimization may be used to determine three rotations and two of three translation components. The loop closure may also include a two degree of freedom optimization to obtain interframe three-dimension to three-dimension matches to complete a seven degree of freedom similarity, obtain a distance between frame position and a relative point cloud scale, and complete the loop closure.

In some cases, the loop closure may be performed over the scanning process to align each frame with prior frames and replacement of alignments when a more accurate alignment is detected. In some examples, the icon (e.g., the circle, pie, crosshair, or the like) may be placed further to one direction than is necessary on the display to ensure that the user has sufficient overlap in the image data being captured.

In some examples, the system may process multiple spins (e.g., spheres of capture) within the same physical environment. For example, the use of multiple spin captures may be processed in the same room to assist with blocked or obstructed areas of the room (such as in a L-shaped room, a large piece of furniture is located in the middle, and the like).

In some examples, the system may generate three-dimensional computer-aided design (CAD) model as well as three-dimensional models that include semantic information (such as related to objects, surfaces, and the like). In some implementations, the processes, such as the scanning, generation of the model, assigning semantic labels, and the like, may be performed on device (e.g., on the capture device), in part on the device and in part using cloud-based services, and/or the processing may be substantially (e.g., other than capturing sensor data) performed at the cloud-based service. In one implementation, the system may detect the capabilities (e.g., memory, speed, through-put, and the like) of the capture device and, based on the capabilities, determine if the processing is on-device, in-the-cloud or both. When the cloud-based services are used, the device may upload the sensor data via chunks or as a streamed process. In one specific example, the device may run real-time tracker and SLAM system on device to provide the user with real-time feedback and the cloud-service may be used to improve the quality and generate the final three-dimensional scene or model.

In some implementations, the system may desire to initialize the user with respect to a stored model or map. In these implementations, the system may request the user to capture sensor data associated with a fixed plane, such as the ground plane or floor. By capturing the floor, the system is able to estimate a depth (e.g., approximate distance to the floor from the capture device). The system may then perform keypoint matching to determine the user's position within the three-dimensional model or scene and initialize SLAM tracking.

FIG. 1 illustrates an example of a user 102 scanning a physical environment 104 with a capture device 106 and associated cloud-based service 108 according to some implementations. In the current example, the user 102 may select a position relatively nearby the center of the physical environment 104. The user 102 may then initialize a three-dimensional scanning or modeling application hosted on the capture device 106. The capture device 106 may provide the user 102 with instructions via an output interface, such as a display. The instructions may cause the user to perform a depth determination by activating one or more sensors (such as an image capture device and/or an or position sensor) and directing the one or more sensors at a corner, wall, or other object within the physical environment 104. The instructions may then cause the user 102 to move the capture device 106 in a predetermined pattern, such as side to side or up and down.

The captured sensor data 110 may then be processed using a parallax technique to determine the depth of the physical environment 104 and initialize SLAM tracking operations. In some cases, the depth determination may be made on the capture device 106 while, in other cases, the depth determination may be performed by depth service 112 of the cloud-based service 108. In some cases, the scanning or modeling application may determine whether or not to engage the cloud-based services 108 based on one or more detected capabilities (e.g., memory, processors, and the like) of the capture device 106. In other examples, the capture device 106 may include a depth sensor capable of determining the depth of the physical environment 104 without the usage of the parallax technique discussed above.

Next, the instructions presented to the user 102 may cause the user to attempt to generate a desired motion with respect to the capture device 106 for a desired period of time (e.g., a predetermined period or until a threshold amount of sensor data 110 is captured). For example, the scanning or modeling application may cause the capture device 106 to display a progress indicator and a motion indicator to assist the user in generating the desired motion. As discussed above, the motion may include circles, infinity signs, figure eights, or the like, to cause the sensors to capture image data associated with a particular feature of the environment from different angles and to capture orientation and motion data associate with the capture device 106 as the device 106 is moved. In some examples, the scale may also be initialized using detection of known objects, such as standard door height or the like. In other cases, the user 102 may enter a known distance (e.g., measured using a laser tool and/or tape measure) via an input interface of the capture device 106.

Using the image data and the orientation and motion data (e.g., additional sensor data 110), the scale of the environment 104 may be determined. For instance, using the sensor data 110 and the known trajectory of the motion, the scanning or modeling application and/or a scale service 114 of the cloud-based service 108 may determine a calibration and/or accuracy of the position sensors and, thereby, determine a scale associated with the physical environment 104. In the current example, the depth and scale determinations are discussed with respect to different processes and motions of the capture device 106. However, it should be understood that in some implementations the processes and/or motions may be combined such that the depth and scale are determined in parallel from the same sensor data 110.

Once the SLAM tracking is initialized on the device 106 and the depth and scale of the physical environment 104 is determined, the user 102 is ready to scan or capture the image data usable to generate the scale three-dimensional scene or model of the physical environment 104. During the scanning or capture phase, the capture device 106 may display a visual indication such as an opaque three-dimensional sphere (or cylinder, cube, polygon or other three-dimensional shape) with the center being the position of the user 102 or the capture device 106. As the user 102 scans the environment 104 a portion of the opaque sphere is completed on the display of the capture device 106. In some instances, the actual image data may be used to represent the completed portion of the sphere to provide a photo realistic quality to the capture session. The portion of the opaque sphere completed on the display of the capture device 106 may be smaller than the region of the physical environment 104 captured by the image sensors of the capture device 106 to encourage the user 102 to capture overlapping image or sensor data 110.

In some implementations, as the user 102 substantially completes the scan (e.g., has met or exceed a desired scanning threshold, such as 90%, 95%, 99%, etc.) the scanning or modeling application may enter a guided loop closure process. During the guided loop closure, the capture device 106 may display a loop closure icon and a target icon. The guided loop closure may assist the user 102 by asking the user to align the loop closure icon with the target icon while scanning the physical environment 104. Once the sensor data 110 associated with the loop closure is captured by the capture device 106, the scanning or modeling application and/or the loop closure service 116 may perform operations to complete the scan. For example, the scanning or modeling application and/or the loop closure service 116 may perform a bundle adjustment on the sensor data 110 (e.g., the image data and the orientation data).

The scanning or modeling application and/or a modeling service 118 of the cloud-based service 108 may then generate a three-dimensional model or scene 120 from the sensor data 110. In some cases, the three-dimensional model or scene 120 may include a CAD model as well as three-dimensional models that include semantic information (such as related to objects, surfaces, and the like). In some implementations, the scanning or modeling application and/or a modeling service 118 may utilize machine learning models (such as one or more trained neural network), to assign semantic labels, and the like, prior to allowing the user 102 to access the model or scan.

As discussed above, in one example, the capture device 106 may be a portable electric device, such as tablets, netbooks, laptops, cell phones, mobile phones, smart phones, etc. that includes processing and storage resources, such as processors, memory devices, and/or storage devices. The cloud-based services 108 may include various processing resources, such as the servers and datastores, generally indicated by 122, that are in communication with the capture device 106 and/or each other via one or more networks 124.

Figure 2:
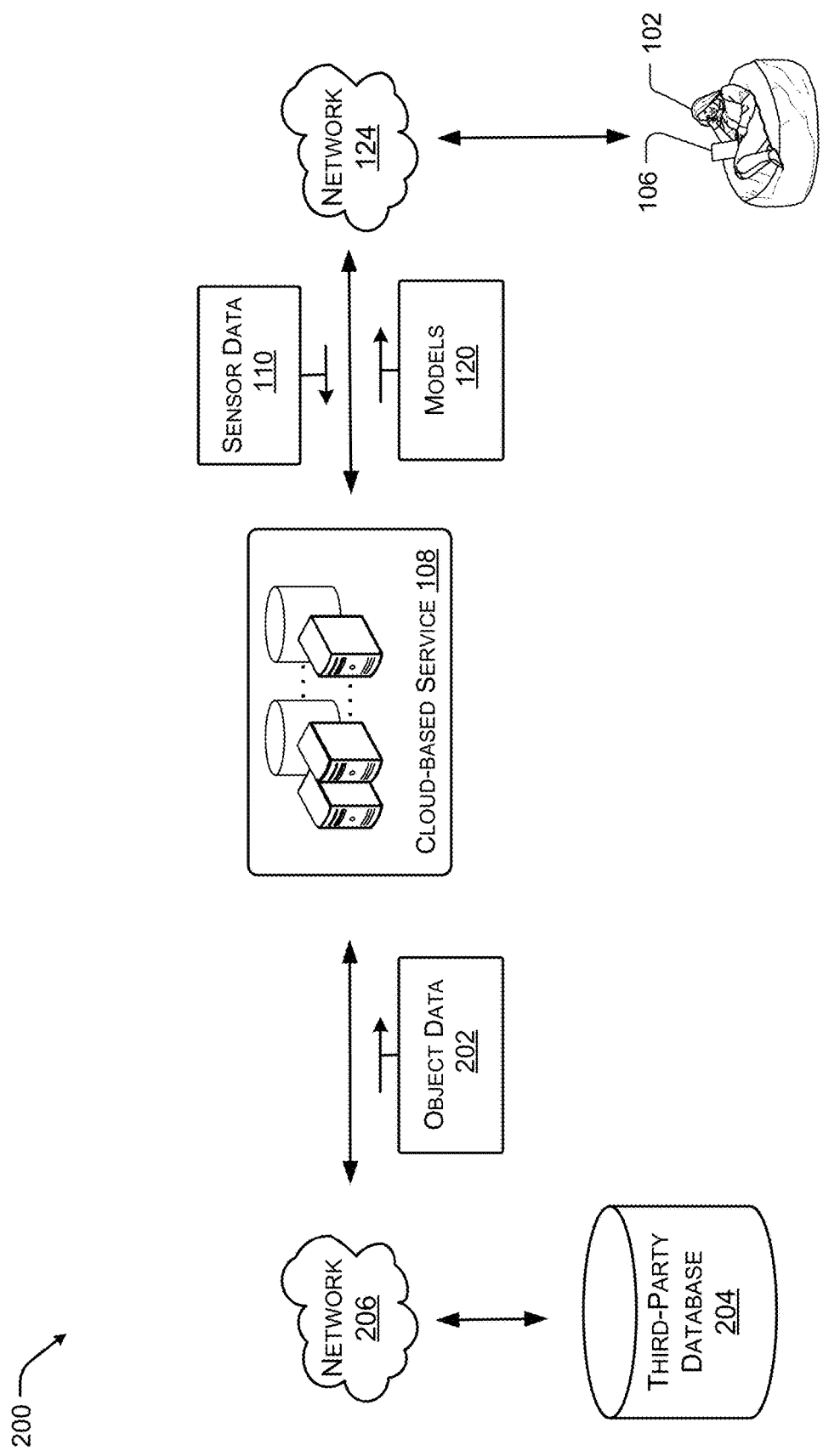
FIG. 2 illustrates an example system for generating three-dimensional models or scenes, according to some implementations.

FIG. 2 illustrates an example system 200 for generating three-dimensional models or scene, according to some implementations. In the current example, the user 102 may capture sensor data 110 using a capture device 106 as discussed above with respect to FIG. 1. The sensor data 110 may be provided to a cloud-based service 108 and a three-dimensional model or scene 120 may be provided back to the user 102 via the capture device 106. In some cases, the cloud-based service 108 may add semantic labels or other context to the three-dimensional model. For example, the cloud-based service 108 may label the objects within the physical environment. In these cases, the cloud-based service 108 and or a scanning or modeling application hosted on the capture device 106 may receive object data 202 from one or more third-party databases 204 via one or more networks 206. The object data 202 may include object models (such as CAD models), semantic information, such as dimensions, price, repair options, materials, patterns, and the like. In one specific example, the cloud-based service 108 and/or the scanning or modeling application may also add object data associated with replacement or alternative objects available for purchase.

Figure 3:
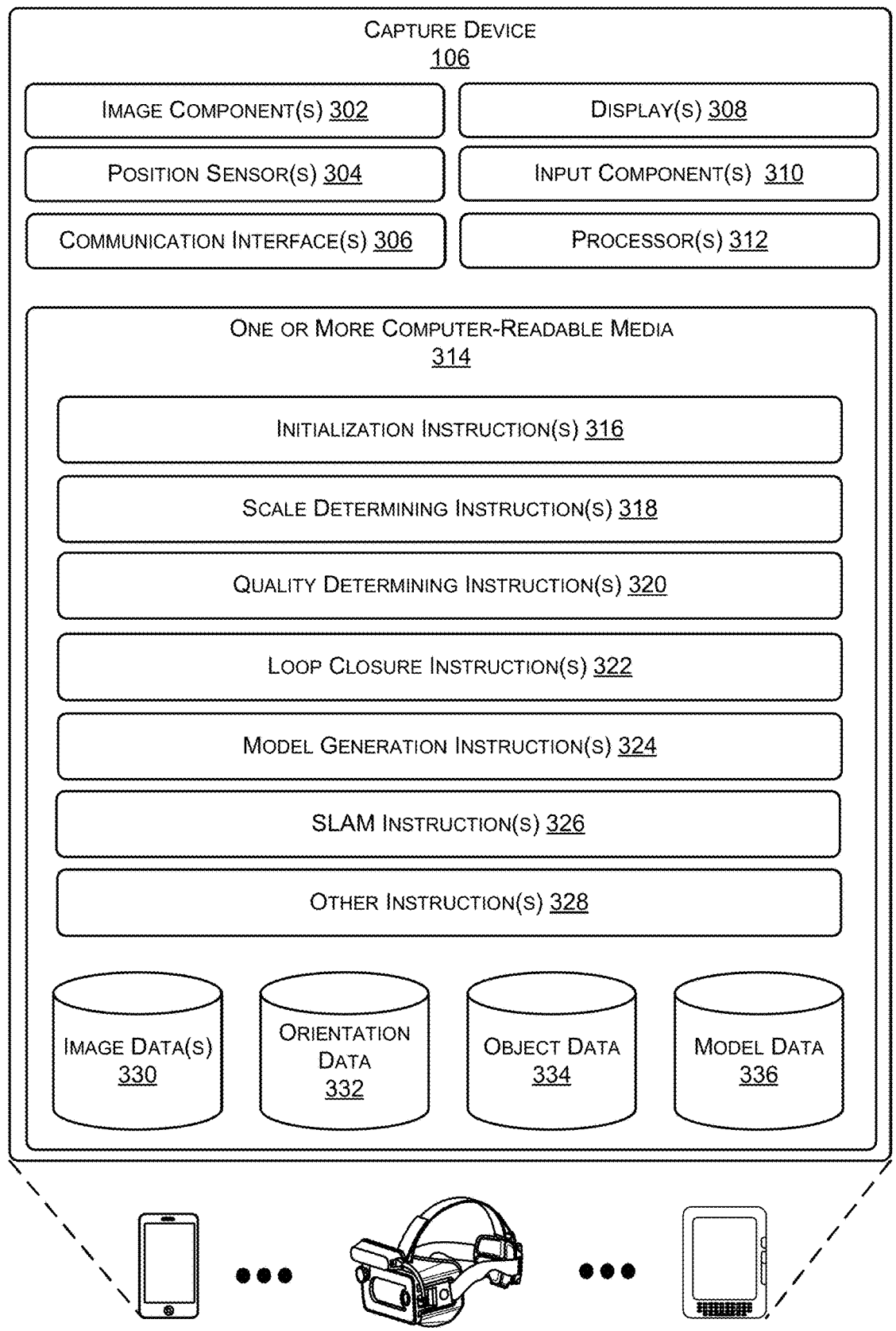
FIG. 3 is an example capture device hosting a scanning or modeling application according to some implementations.

FIG. 3 is an example capture device 106 hosting a scanning or modeling application according to some implementations. As described above, the capture device 106 may be used by a user to scan or otherwise generate a three-dimensional model or scene of a physical environment. In the current example, the capture device 106 may include image components 302 for capturing visual data, such as image data, video data, depth data, color data, infrared data, or the like from a physical environment surrounding the device 106. For example, the image components 302 may be positioned to capture multiple images from substantially the same perspective (e.g., a position proximate to each other on the capture device 106). The image components 302 may be of various sizes and quality, for instance, the image components 302 may include one or more wide screen cameras, three-dimensional cameras, high definition cameras, video cameras, infrared camera, depth sensors, monocular cameras, among other types of sensors. In general, the image components 302 may each include various components and/or attributes.

In some cases, the capture device 106 may include one or more position sensors 304 to determine the orientation and motion data of the capture device 106 (e.g., acceleration, angular momentum, pitch, roll, yaw, etc.). The position sensors 304 may include one or more IMUs, one or more accelerometers, one or more gyroscopes, one or more magnetometers, and/or one or more pressure sensors, as well as other sensors. In one particular example, the position sensors 304 may include three accelerometers placed orthogonal to each other, three rate gyroscopes placed orthogonal to each other, three magnetometers placed orthogonal to each other, and a barometric pressure sensor.

The capture device 106 may also include one or more communication interfaces 306 configured to facilitate communication between one or more networks and/or one or more cloud-based services, such as cloud-based services 108 of FIGS. 1 and 2. The communication interfaces 306 may also facilitate communication between one or more wireless access points, a master device, and/or one or more other computing devices as part of an ad-hoc or home network system. The communication interfaces 306 may support both wired and wireless connection to various networks, such as cellular networks, radio, WiFi networks, short-range or near-field networks (e.g., Bluetooth®), infrared signals, local area networks, wide area networks, the Internet, and so forth.

The capture device 106 may also include one or more displays 308. The displays 308 may include a virtual environment display or a traditional two-dimensional display, such as a liquid crystal display or a light emitting diode display. The capture device 106 may also include one or more input components 310 for receiving feedback from the user. In some cases, the input components 310 may include tactile input components, audio input components, or other natural language processing components. In one specific example, the displays 308 and the input components 310 may be combined into a touch enabled display.

The capture device 106 may also include one or more processors 312, such as at least one or more access components, control logic circuits, central processing units, or processors, as well as one or more computer-readable media 314 to perform the function associated with the virtual environment. Additionally, each of the processors 312 may itself comprise one or more processors or processing cores.

Depending on the configuration, the computer-readable media 314 may be an example of tangible non-transitory computer storage media and may include volatile and non-volatile memory and/or removable and non-removable media implemented in any type of technology for storage of information such as computer-readable instructions or modules, data structures, program modules or other data. Such computer-readable media may include, but is not limited to, RAM, ROM, EEPROM, flash memory or other computer-readable media technology, CD-ROM, digital versatile disks (DVD) or other optical storage, magnetic cassettes, magnetic tape, solid state storage, magnetic disk storage, RAID storage systems, storage arrays, network attached storage, storage area networks, cloud storage, or any other medium that can be used to store information and which can be accessed by the processors 312.

Several modules such as instruction, data stores, and so forth may be stored within the computer-readable media 314 and configured to execute on the processors 312. For example, as illustrated, the computer-readable media 314 store initialization instructions 316, scale determining instructions 318, quality determining instructions 320, loop closure instructions 322, model generation instructions 324, SLAM instructions 326, as well as other instructions, such as operating instructions. The computer-readable media 314 may also store data usable by the instructions 316-328 to perform operations. The data may include image data 330 such as data captured by the image components 302, orientation and motion data 332 such as data captured by the position sensors 304, object data 334 such as semantic information related to various objects, and/or model data 336.

The initialization instructions 316 may comprise a user interface presented on the display 308 to assist the user in initializing the SLAM instructions 326. For example, the initialization instructions 316 may provide instructions to the user to position themselves to relatively center with respect to a physical environment. The initialization instructions 316 may then request the user initialize the scan by moving the capture device 106 in a desired manner (such as side to side) to generate a translation movement. The translation movement may be utilized by the SLAM instructions 326 to initialize tracking on the capture device 106. In some implementations, the initialization instructions 316 may request the user select a starting image component field of view in which an object or corner is visible. In some cases, once the user has successfully initialized the SLAM instructions 326, the initialization instructions 316 may display a success icon or other type of notification (e.g., visual, audio, tactile, etc.) to alert the user that the initialization instructions 316 are compete.

The scale determining instructions 318 may be configured to determine a scale of the physical environment with respect to the capture device 106. In these instances, the scale determining instructions 318 may cause the display 308 to present the user with a progress indicator and a motion indicator as well as one or more guides to assist the user in initializing scale. The scale determining instructions 318 may request the user to perform a motion depicted by the motion indicator (such as a circle, infinity sign, figure eight, or the like). The indicated motion may include both side to side motion and up and down motion as part of a single trajectory or movement such that the image components 302 may capture image data 330 associated with a particular feature of the environment from different angles and the position sensors 304 to capture orientation and motion data associated with the capture device 106. The scale determining instructions 318 may also present a tracking indicator and a user motion indicator on the display. The tracking indicator may illustrate a speed and direction for the user to move the capture device 106 with respect to the motion indicator. The user motion indicator may illustrate the user's actual movements of the capture device 106, such that the user may learn to match the capture device 106 movements to the desired trajectory and speed. The scale determining instructions 318 may then determine a scale of the environment based on the captured image data 330 and orientation and motion data 332.

The quality determining instructions 320 may be configured to determine a quality of the three-dimensional scene, model, or portion of the scene or model (e.g., a frame) based at least in part on a number of detected keypoints (e.g., greater than or less than a threshold number of keypoints), number of keypoints in a frame, number of keypoint matches between current frame and a reference or prior frame (e.g., greater than or less than a threshold number of matches), number of inlier keypoints (e.g., compared to a threshold), total parallax between prior frames (e.g., greater or less than a parallax threshold), an accuracy of the pose estimation via the SLAM tracking, and the like.

The quality determining instructions 320 may also attempt to improve the overall quality of the image data 330. For example, the quality determining instructions 320 may perform a shutter analysis based at least in part on the orientation and motion data 332. The quality determining instructions 320 may apply the motion blur and/or rolling shutter based at least in part on a speed, acceleration of rotation, translation, translation over a selected axis, depth, detect lines, current pose or other output of the SLAM instructions 326, and the like to improve the model quality. In some cases, the quality determining instructions 320 may provide the user with real-time feedback on the motion. For example, the quality determining instructions 320 may cause the display 308 to notify the user to hold still, speed up, slow down, or the like to assist with maintaining image quality, SLAM tracking, and/or model generation.

The loop closure instructions 322 may be configured to cause the display 308 to assist the user in capturing image data 330 and then utilizing the image data 330 to perform loop closure operations on the model. In some cases, the loop closure instructions 322 may determine the scan is substantially completed (e.g., has met or exceed a desired scanning threshold, such as 90%, 95%, 99%, etc.). The loop closure instructions 322 may then display a loop closure icon, such as a circle or pie shape including a missing portion or piece on the display 308. The loop closure icon may assist the user by showing the user how to maneuver the capture device 106 in a manner to capture image data 330 (e.g., re-scanning areas that have already been captured) to complete the model via loop closure operations.

The loop closure instructions 322 may then perform loop closure operations such as a bundle adjustment. In one specific example, the loop closure may utilize may perform a five degree of freedom optimization using a two-dimension to two-dimension matches (e.g., keypoint or feature point) to obtain isometry up to scale. In some cases, the five degree of freedom optimization may be used to determine three rotations and two of three translation components. The loop closure may also include a two degree of freedom optimization to obtain interframe three-dimension to three-dimension matches to complete a seven degree of freedom similarity, obtain a distance between frame position and a relative point cloud scale, and complete the loop closure.

The model generation instructions 324 may be configured to generate three-dimensional models such as CAD models as well as three-dimensional models that include semantic information (such as related to objects, surfaces, and the like). In some implementations, model generation instructions 324 may assign object data 334 to various objects detected in the environment. In these cases, the model generation instructions 324 may apply segmentation operations and/or classification operations, such as via a machine learning model, to apply the object data to the models.

The SLAM instructions 326 may be configured to track the position and orientation of the capture device 106 within, for example, six degrees of freedom. In various implementations, the SLAM instructions 326 may use one or more known SLAM technique to track the six degree of freedom position of the capture device 106 in substantially real time.

FIGS. 4-9 are flow diagrams illustrating example processes associated with determining a 6DOF pose of a capture device according to some implementations. The processes are illustrated as a collection of blocks in a logical flow diagram, which represent a sequence of operations, some or all of which can be implemented in hardware, software or a combination thereof. In the context of software, the blocks represent computer-executable instructions stored on one or more computer-readable media that, which when executed by one or more processors, perform the recited operations. Generally, computer-executable instructions include routines, programs, objects, components, encryption, deciphering, compressing, recording, data structures and the like that perform particular functions or implement particular abstract data types.

The order in which the operations are described should not be construed as a limitation. Any number of the described blocks can be combined in any order and/or in parallel to implement the process, or alternative processes, and not all of the blocks need be executed. For discussion purposes, the processes herein are described with reference to the frameworks, architectures and environments described in the examples herein, although the processes may be implemented in a wide variety of other frameworks, architectures or environments.

The processes discussed below with respect to FIGS. 4-9 are discussed with respect to a capture device located physically within an environment. However, it should be understood that some or all of the steps of each process may be performed on device, in the cloud, or a combination thereof. Further, it should be understood that the processes of FIGS. 4-9 may be used together or in conjunction with the examples of FIGS. 1-3 above and 10-16 below.

Figure 4:
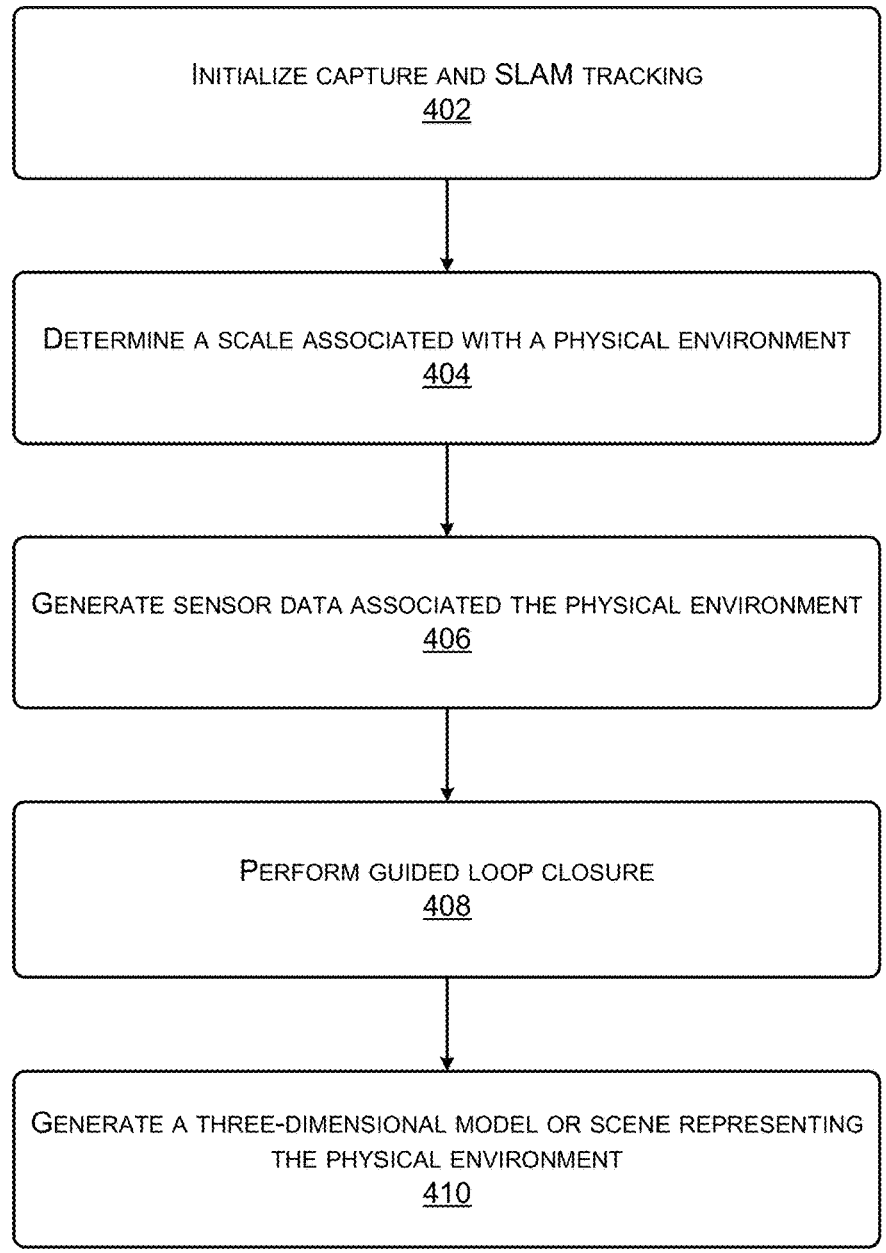
FIG. 4 is an example flow diagram showing an illustrative process for generating a three-dimensional scan of a physical environment according to some implementations.

FIG. 4 is an example flow diagram showing an illustrative process 400 for generating a three-dimensional scan of a physical environment according to some implementations. As discussed above, in some instance, a user may desire to generate a three-dimensional model or scene using a capture device equipped with monocular imaging components. The scanning and capture process may be guided to assist the user in collecting data usable to accurately engage a SLAM tracking, determine a depth and/or scale of the environment, and capture image data in an overlapping manner that allows a computer system to combine into a three-dimensional model or scene.

At 402, the system may assist the user in initializing capture and SLAM tracking on a capture device located physically within the physical environment being scanned. For example, the capture device may present on a display, instructions to cause the user to take a position central to the physical environment. The capture device may also display instructions to cause the user to move the capture device in a first predetermined manner, such as side to side. The capture device may then engage the SLAM tracking using the orientation and motion data generated by one or more position sensors and the image data captured by the one or more image components.

At 404, the system may assist the user with determining a scale associated with the physical environment. For example, the system may present a motion indicator representing a second desired predetermined motion for the user to make with the capture device. In some cases, the system may also display a tracking indicator showing characteristics (e.g., speed, direction, and the like) of the desired motion and a user motion indicator showing characteristics of the actual motion of the capture device. In some cases, the capture device may also display a progress indicator to give the user an indication of the remaining amount of time that they should continue to move the capture device according to the motion indicator.

As the user completes the guided scale determination motion, the capture device may capture orientation and motion data and/or image data. The capture device may then determine the scale of the environment based at least in part on the orientation data, image data, and the known pattern of motion indicated by the motion indicator. In some cases, the steps 402 and 404 may be combined such that the user moves the capture device in a single predetermined motion that allows the capture device to engage the SLAM tracking and determine the scale in at substantially the same time.

At 406, the capture device may capture sensor data (e.g., image data and/or orientation data) associated with the physical environment via a guided scanning process. For instance, the capture device may present an opaque three-dimensional shape on the display. In some cases, the representation of the opaque three-dimensional shape may include a viewpoint as if the user was positioned within the center of the shape. In some instances, the shape may include a cylinder, cube, sphere, polygon, or other three-dimensional shape or object. As the capture device captures image data associated with the environment, the capture device may complete or fill in corresponding portions of the opaque shape. In this manner, the user is able to visualize the portion of the physical environment that is scanned and the portions that remain unscanned. In some examples, the capture device may complete a region smaller than the size of the image data (e.g., each frame) with respect to the opaque object to cause the user to capture frames of image data having overlapping portions that are usable for combining the two-dimensional image data together to form a three-dimensional model.

At 408, the system may assist the user to perform a guided loop closure process. For example, the capture device may display a target or target icon on the display as well as a position indicator. The capture device may then instruct the user to align the position indicator with the target while the capture device obtains additional image data and/or orientation data. The capture device may then utilize the additional image data and/or orientation and motion data to perform the loop closure.

At 410, the system may generate a three-dimensional model or scene representing the physical environment. For example, the model may include a CAD model as well as three-dimensional models that include semantic information (such as related to objects, surfaces, and the like).

Figure 5:
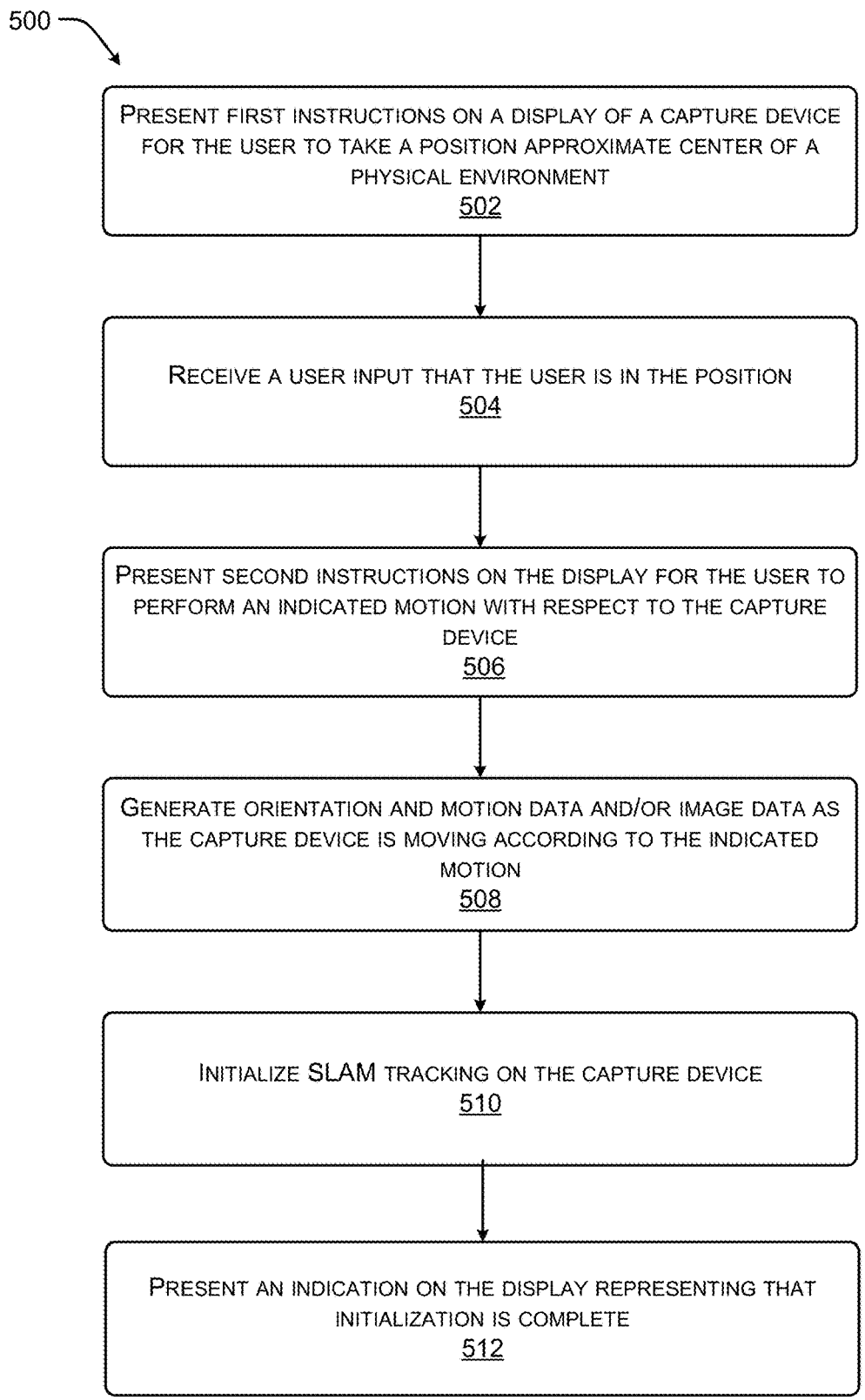
FIG. 5 is another example flow diagram showing an illustrative process for initializing a SLAM tracking operating according to some implementations.

FIG. 5 is another example flow diagram showing an illustrative process 500 for initializing a SLAM tracking operation according to some implementations. As discussed above, prior to scanning a physical environment the capture device should initialize a SLAM tracking system to assist with determining a pose of the capture device as the environment is scanned. The pose may then be used to assist with combining the captured two-dimensional image data into a three-dimensional model.

At 502, the system may present first instructions on a display of a capture device for the user to take a position approximate to the center of the physical environment. For example, the capture device may present an icon as well as text based instructions on the display.

At 504, the system may receive a user input that the user is in the position. For example, the capture device may include a user input interface, such as a touch screen, that allows the user to notify the capture device that the user is ready to begin the scanning process.

At 506, the system may present second instructions on the display for the user to perform an indicated motion with respect to the capture device. For example, the motion may be a side to side motion, and up and down motion, a circular motion or the like. In some cases, the system may cause the user to point the capture device or image component at a feature, corner, or other distinguishable object when performing the motion.

At 508, the system may capture orientation and motion data and/or image data as the capture device is moving according to the indicated motion. For example, the image data may represent the same object or feature from multiple direction.

At 510, the system may initialize SLAM tracking on the capture device based on the orientation and motion data and/or image data. For example, the SLAM tracking may be initialized based at least in part on a parallax operation associated with the image data.

At 512, the system may present an indication on the display representing that initialization has been completed. For example, once the SLAM tracking is engaged the system may present the indication representing that the initialization is competed.

Figure 6:
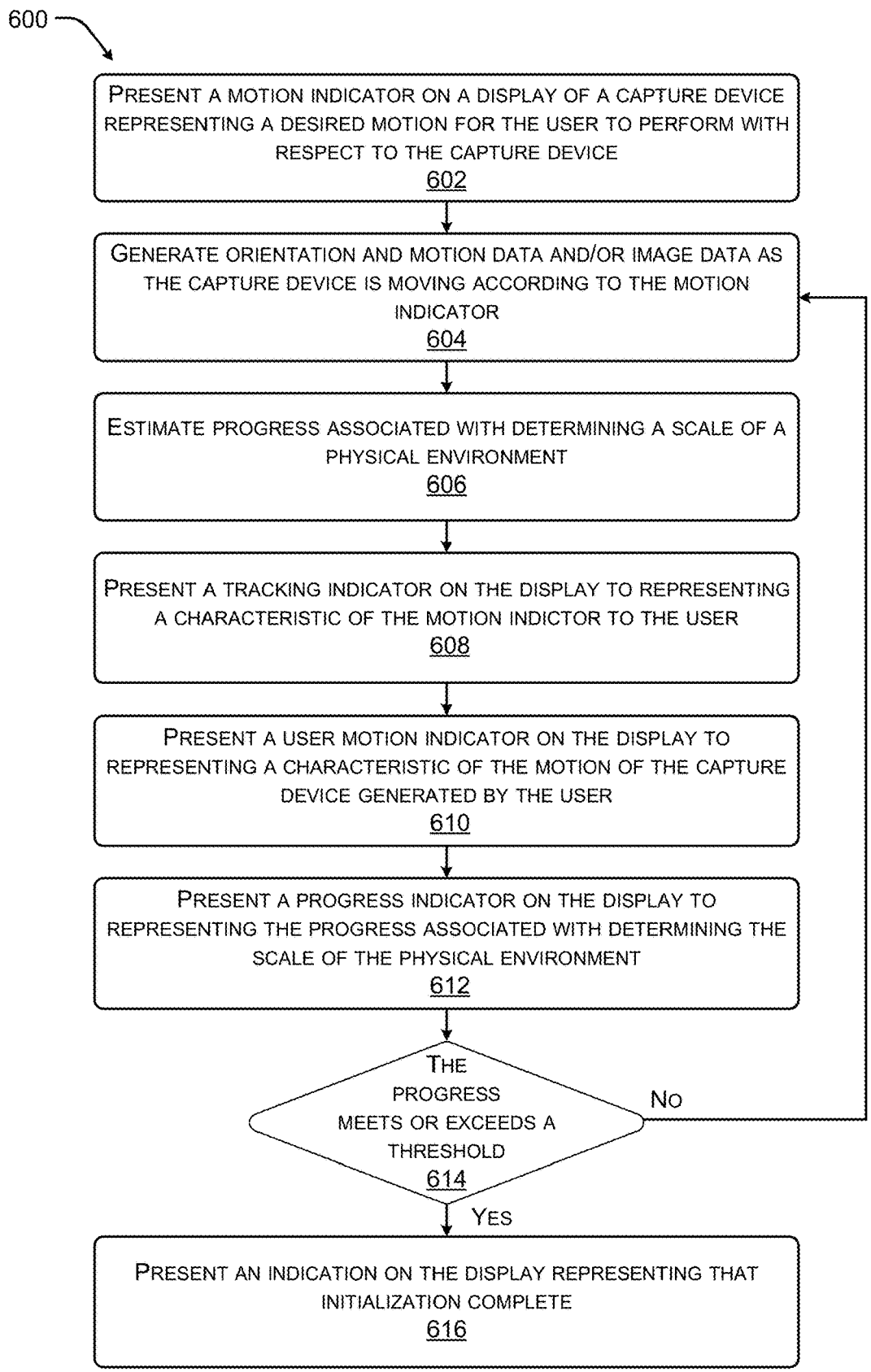
FIG. 6 is another example flow diagram showing an illustrative process for determining a scale of a physical environment according to some implementations.

FIG. 6 is another example flow diagram showing an illustrative process 600 for determining a scale of a physical environment according to some implementations. In some cases, the capture device may be equipped with a depth sensor that is able to determine a depth and/or scale of the physical environment. However, in many cases, the capture device may not include a depth sensor.

At 602, the capture device may present a motion indicator on a display. The motion indicator may represent a desired motion for the user to perform with respect to the capture device. For example, the user may move the capture device in a circle, figure eight, infinity sign, or the like.

At 604, the capture device may capture orientation and motion data and/or image data as the capture device is moving according to the motion indicator. For example, the capture device may be equipped with one or more two-dimensional image devices and/or various position sensors, such as an IMU, accelerometer, or the like.

At 606, the capture device may estimate progress associated with determining the scale of the physical environment. For example, the progress may represent an estimate of the remaining time that the user may continue to perform the motion until sufficient data is collected to determine the scale.

At 608, the capture device may present a tracking indicator on the display. The tracking indicator may represent a characteristic of the motion indicator to the user. For example, the tracking indicator may represent a desired direction, speed, velocity or the like associated with the motion.

At 610, the capture device may present a user motion indicator on the display. The user motion indicator may represent a characteristic of the motion of the capture device generated by the user. Again, the characteristic may include a direction, speed, velocity and the like of the capture device. In this manner, the user may compare the user motion indicator with the tracking indicator and/or the motion indicator to assist the user in performing the motion at a desired speed and direction to improve the data collection process.

At 612, the capture device may present a progress indicator on the display. The progress indicator may represent the progress associated with determining the scale of the physical environment and provide the user with an indication of the remaining time that the user should continue to perform the motion.

At 614, the capture device may determine if the progress meets or exceeds a threshold. For example, the capture device may determine if sufficient data has been collected to determine the scale of the physical environment. If there is not sufficient data, the process 600 may return to 604 and continue to generate or capture orientation and motion data and/or image data. However, if there is sufficient data, the process 600 may advance to 616. At 616, the capture device may present an indication on the display representing that initialization complete.

FIG. 7 is another example flow diagram showing an illustrative process 700 for providing a guided scan of a physical environment according to some implementations. As discussed above, the system, described herein, provides a guided scan session to assist the user in capturing image data of the physical environment without gaps and with enough overlap between frames to provide improved alignment as the model is built.

At 702, the capture device may present an opaque three-dimensional shape or visual indication on a display of a capture device representing an unscanned portion of a physical environment. Initially, the entire shape may be opaque and as the user competes a circular or spherical scan of the physical environment portions of the shape may be completed on the display, as discussed herein. In some examples, the shape or visual indication may be a sphere, a cylinder, cube, or other polygon that may in some cases be adjusted as the physical environment is scanned. The visual indication may also include a density, transparency, mesh, or the like to illustrate completeness of a scanned region or portion. For instance, the shape may be formed based on detected depths, scale, or shape of the physical environment itself. As one illustrative example, the shape may be updated to be longer in one dimension than in a second (e.g., rectangular prism) as the capture device determines the environment is, for instance, a hallway that is longer in one dimension than the other.

At 704, the capture device may capture first image data as the capture device is moved within the physical environment. For example, the capture device may capture a series of frames (such as video or a plurality of still images). In these examples, the first image data may correspond to one or more frames.

At 706, the capture device may determine a first region of the physical environment associated with the image data. For example, the capture device may utilize feature detection, edge detection, keypoint detection, as well as orientation and motion data from the position sensor with respect to each frame to determine the first region and position the first image data with respect to other frames captured by the image capture device.

At 708, the capture device may replace a second region of the opaque three-dimensional shape with a portion of the image data, the second region smaller than the first region. For example, the image data and/or the first region may be X by Y pixels and the second region may be X-K by Y-N pixels. In some cases, both K and N may be a predetermined number of pixels. In some instances, K and N may differ from each other while in specific implementations the values of K and N may be the same.

At 710, the capture device may determine if the scan is complete. For example, if the opaque shape has been entirely replaced with image data, a percentage of the opaque shape that is completed is equal to or greater than a predetermined threshold, any remaining gaps in the image data is less than a second predetermined threshold, and the like. If the scan is complete, the process 700 may end. Otherwise, the process 700 may return to 704 and additional image data is collected and analyzed.

Figure 8:
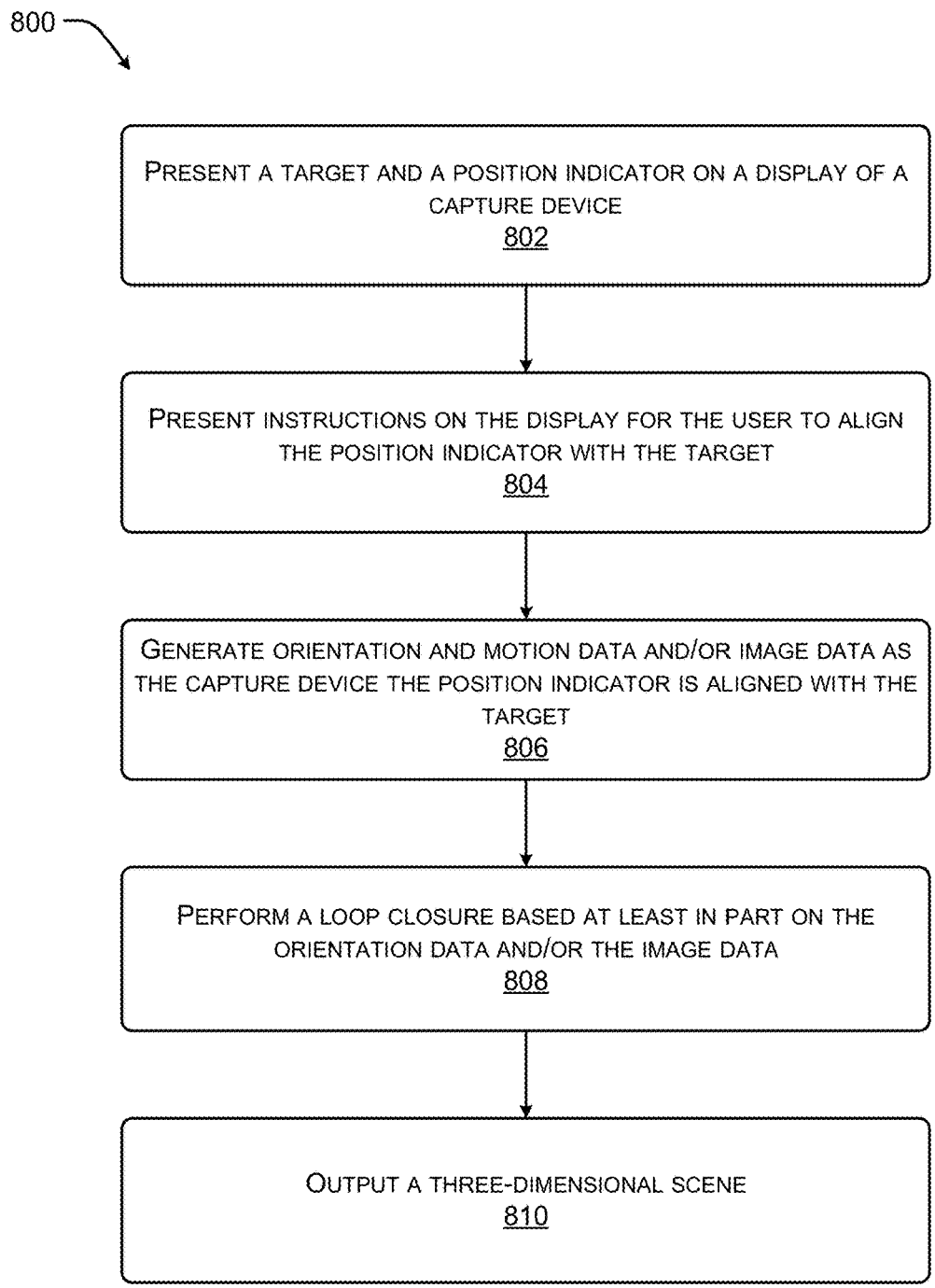
FIG. 8 is another example flow diagram showing an illustrative process for providing a guided loop closure according to some implementations.

FIG. 8 is another example flow diagram showing an illustrative process 800 for providing a guided loop closure according to some implementations. For instance, as the user scans the physical environment, the user will eventually return to the starting location or region. The capture device may then attempt to connect the scan together as a completed environment via the loop closure process 800.

At 802, the capture device may present a target and a position indicator on a display of a capture device. In some cases, the capture device may attempt to assist the user in capturing image data and/or orientation and motion data usable to perform loop closure. In these cases, the capture device may present a target (e.g., a position at which the user should end the scan) and a position indicator or a representation of a current region within the field of view of the image capture device.

At 804, the capture device may present instructions on the display for the user to align the position indicator with the target. For example, the instructions may cause the user to move the capture device within the physical environment such that the position indicator is moved closer to the target and thereby align with each other.

At 806, the capture device may capture orientation and motion data and/or image data as the capture device the position indicator is aligned with the target. As the user moves the capture device within the physical environment, the capture device may collect image data usable to perform loop closure. In this manner, the capture device may capture image data that is associated with a region usable to perform loop closure.

At 808, the capture device may perform a loop closure based at least in part on the orientation and motion data and/or the image data. For example, the capture device may perform a five degree of freedom optimization using a two-dimension to two-dimension matches (e.g., keypoint or feature point) to obtain isometry up to scale. In some cases, the five degree of freedom optimization may be used to determine three rotations and two of three translation components. The capture device may then perform a two degree of freedom optimization to obtain interframe three-dimension to three-dimension matches to complete a seven degree of freedom similarity, obtain a distance between frame position and a relative point cloud scale, and complete the loop closure.

In other examples, the loop closure operations may be performed during the scan. For example, the capture device may match each arriving or detected keyframe to a similarly oriented frame to reduce processing resource requirements. For example, the system may apply one or more heuristics to limit the search and reduce overall processing time and resource consumption. As one illustrative example, a heuristic may utilize frames orientation. The capture device may then, for each candidate frame, select the best match based on, for instance, pose consistency and then adjust the global model.

At 810, the capture device may output a three-dimensional scene. In some examples, the system may generate three-dimensional CAD model as well as three-dimensional models that include semantic information (such as related to objects, surfaces, and the like).

Figure 9:
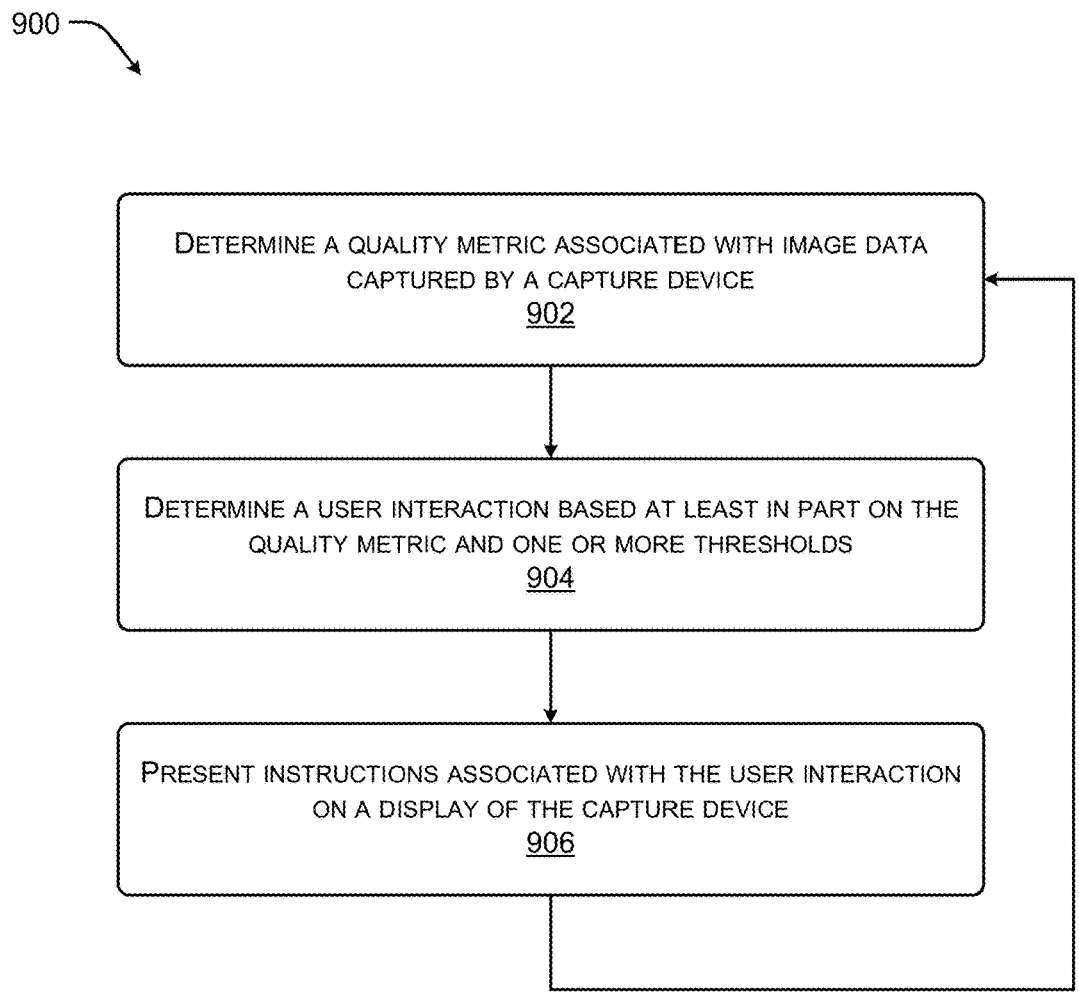
FIG. 9 is another example flow diagram showing an illustrative process for providing a guided quality control associated with scanning a physical environment according to some implementations.

FIG. 9 is another example flow diagram showing an illustrative process 900 for providing a guided quality control associated with scanning a physical environment according to some implementations. In some cases, the capture device may attempt to improve the overall quality of the scan by providing real time instructions related to the scan process, such as process 800 discussed above. For instance, users may scan an environment too quickly, only using video capture (opposed to still image and video capture), too slowly, and the like.

At 902, the capture device may determine a quality metric associated with image data captured by a capture device. For example, the capture device may determine a quality of the image data being captured by the image capture components of the capture device based on the orientation and motion data from the position sensors. For instance, the capture device may determine quality based at least in part on the speed, acceleration (e.g., acceleration of a translation, rotation, or the like), translations over particular degrees of freedom, and the like.

The capture device may also process the image data itself. For example, the quality metric may be determined based at least in part on depth data, blurriness, number of frames, distance of frames, detected lines and/or keypoints, and the like. As one specific example, the capture device may determine if detected lines are straight or include waves, bends, or other anomalous features, as quality images should result in substantially straight lines and edges while blurry images may result in wavy or other anomalous features within the lines and edges. The capture device may also determine quality metrics using a combination of pose data from the SLAM tracking, orientation data, and/or image data.

At 904, the capture device may determine a user interaction based at least in part on the quality metric and one or more thresholds. For example, if the user is moving the capture device too rapidly, the user interaction may be to slow down. In other example, if the capture device has lost SLAM tracking, the user interaction may be to remain still until the SLAM operations are re-engaged. In still other examples, the user may move too slowly, and the user interaction may be to increase a speed of the scan. Other examples may include rotations of the capture device, tilting of the capture device, translation motions from a fixed position, rescanning a prior region, reversing the direction of the scan, pointing the capture device at specific target features and the like.

At 906, the capture device may present instructions associated with the user interaction on a display of the capture device. In some cases, the instructions may be presented until the capture device determines the user interaction has been completed. The instructions may be text based, include icons (such as images of desired motion), and the like. Following, the completion of the user interaction, the process 900 may return to 902 and the quality metrics may be updated, such as on a frame by frame basis or within a sliding window of frames (e.g., a predetermined number of frames).

Figure 10:
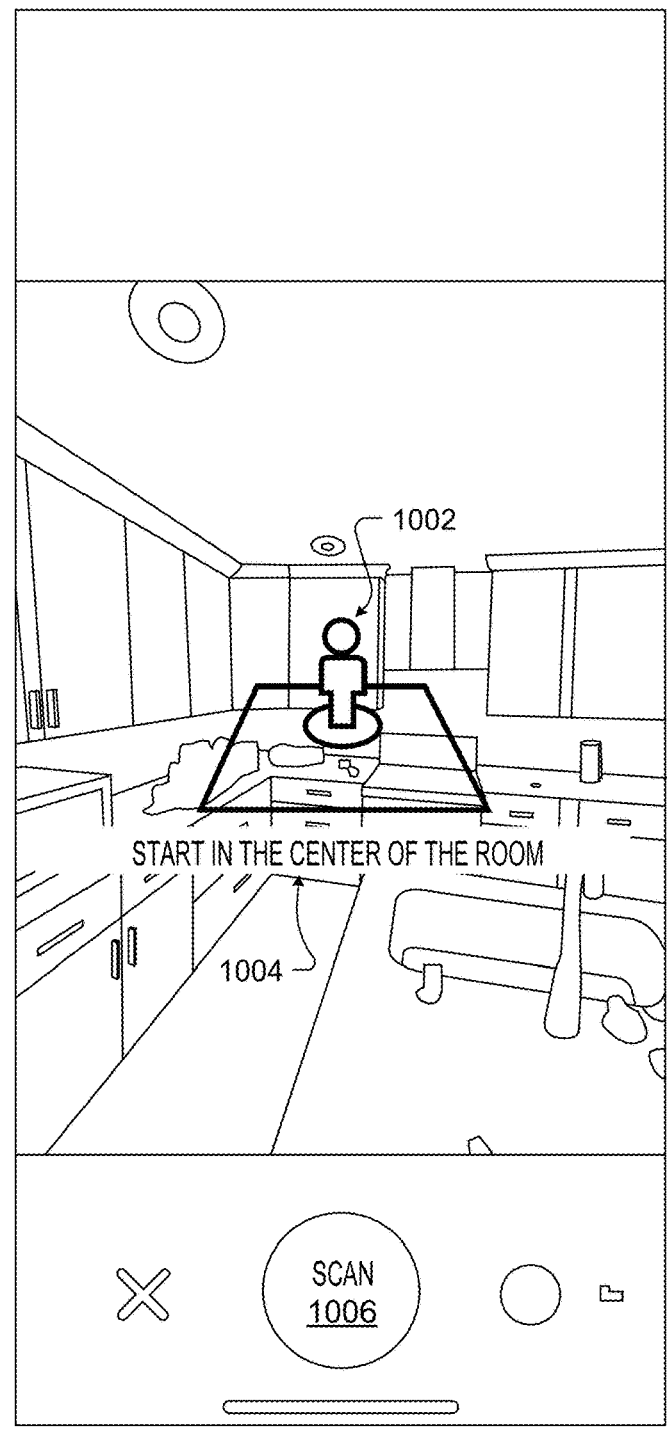
FIG. 10 is an example user interface associated with the initialization process according to some implementations.

FIG. 10 is an example user interface 1000 associated with the initialization process according to some implementations. In the current example, the display of the capture device may include an icon 1002 and text-based instructions 1004 to cause the user to position themselves at the center of the room. The interface 1000 may also include a scan button 1006 for the user to engage once the user is in the center of the room or physical environment.

Figure 11:
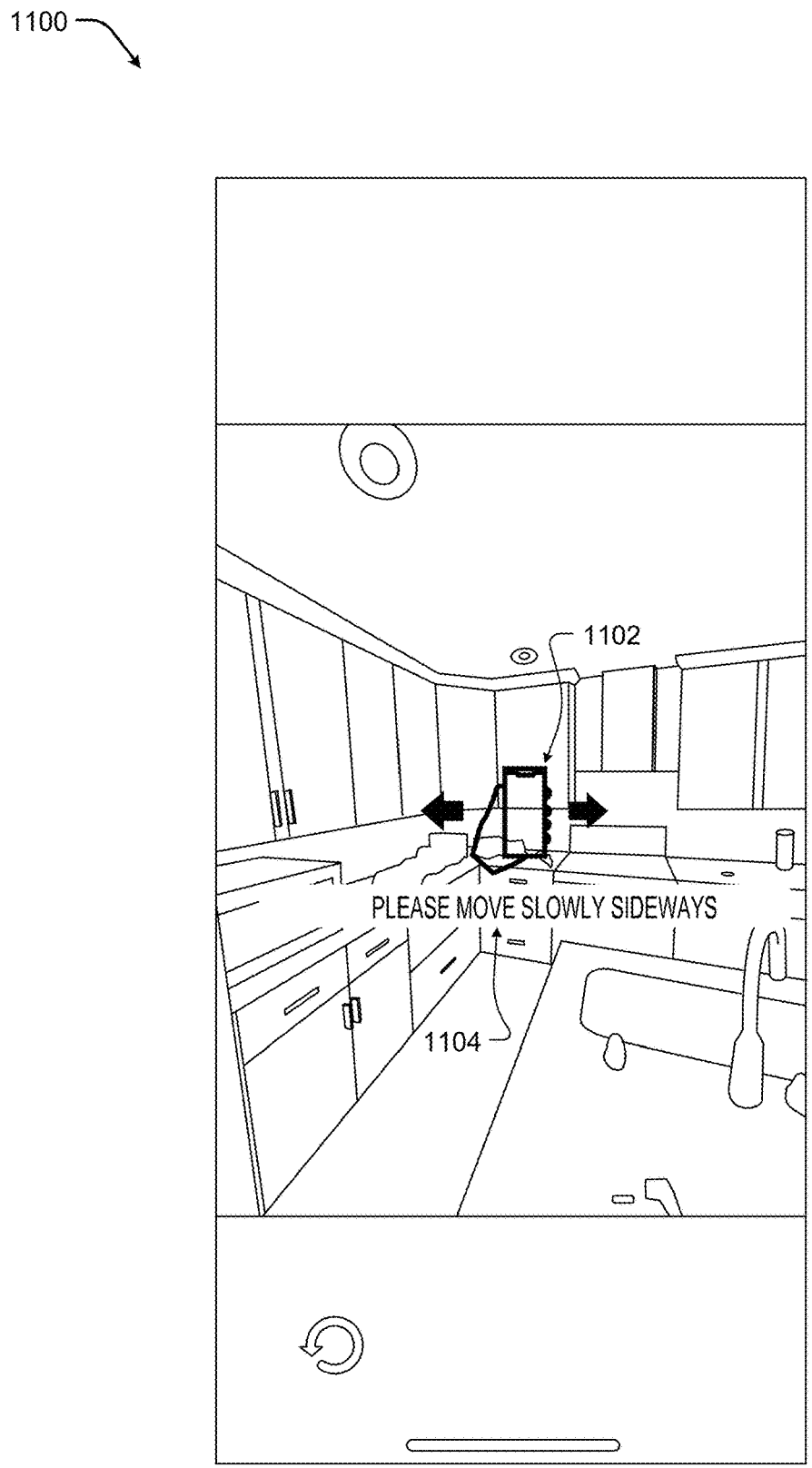
FIG. 11 is another example user interface associated with the initialization process according to some implementations.

FIG. 11 is another example user interface 1100 associated with the initialization process according to some implementations. In the current example, the display of the capture device may include an icon 1102 and text-based instructions 1104 to cause the user to move the capture device in a side to side or other translation like motion. As discussed above, the capture device may then utilize the data captured during the movement to initialize SLAM operations.

Figure 12:
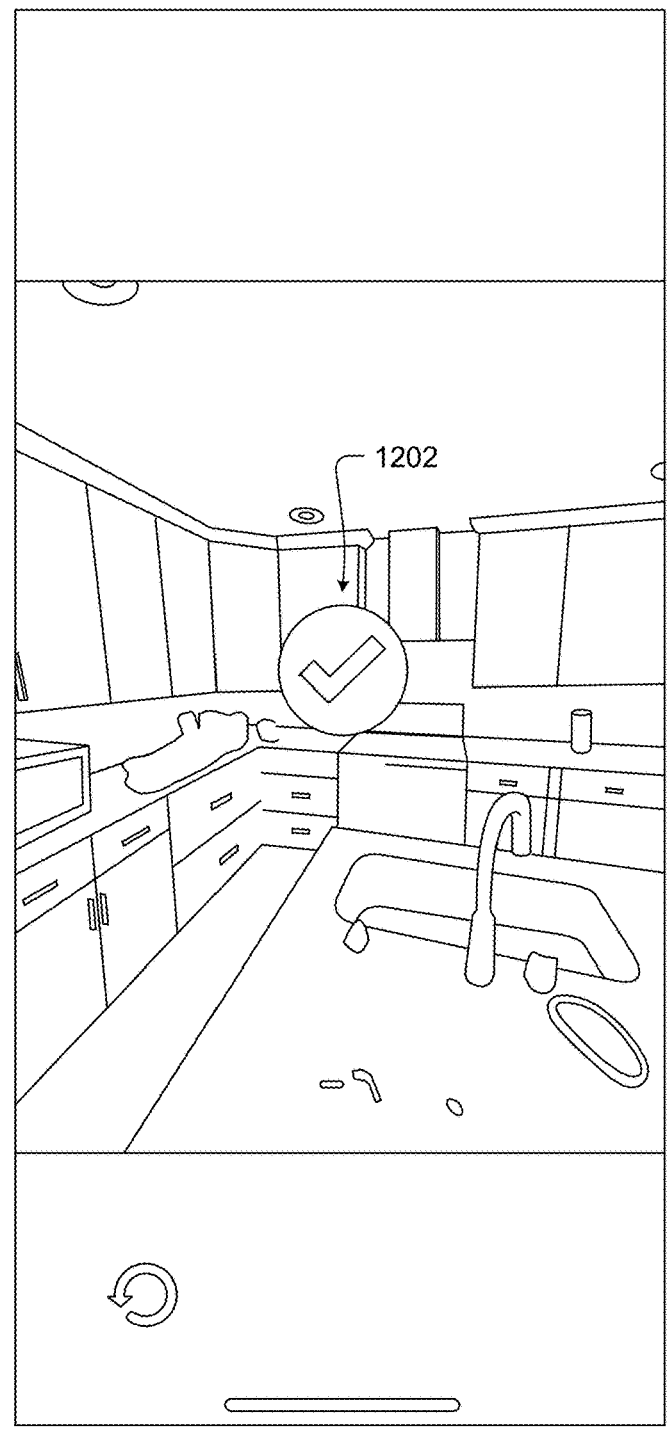
FIG. 12 is another example user interface associated with the initialization process according to some implementations.

FIG. 12 is another example user interface 1200 associated with the initialization process according to some implementations. In the current example, the display of the capture device may include an icon 1202 indicating that the SLAM operations are initialized, and the user may commence the next phase, such as scale determination and/or scanning.

Figure 13:
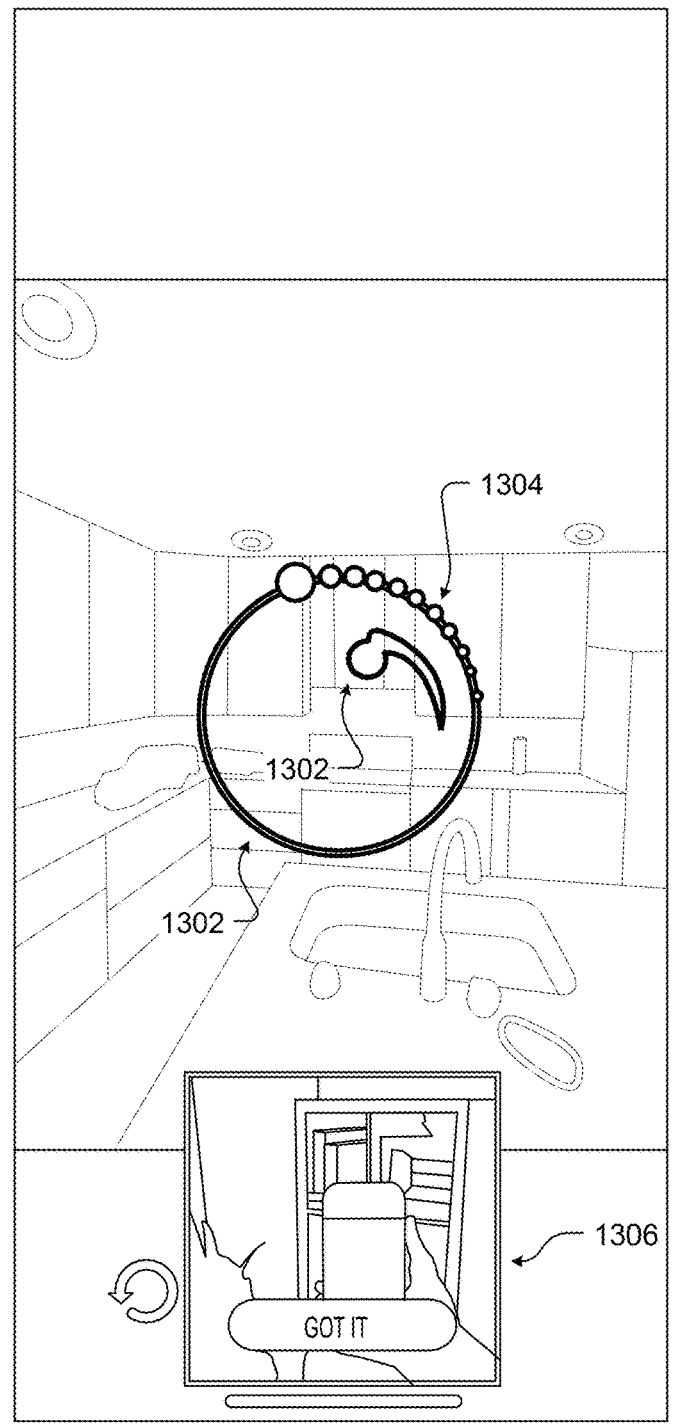
FIG. 13 is an example user interface associated with the scale determination process according to some implementations.

FIG. 13 is an example user interface 1300 associated with the scale determination process according to some implementations. In the current example, the capture device may be attempting to determine a scale of the physical environment. In this example, the display of the capture device may include a motion indicator icon 1302 to illustrate a motion that the user should perform with the capture device. In this case, the motion is a circle but could be other shapes, such as an infinity sign or figure eight.

The interface 1300 may also include a progress indicator icon 1304. For instance, in the current example, the circles along the motion indicator icon 1302 may indicate a progress associated with determining the scale of the physical environment. In this case the user may be approximately a third of the way complete and should continue to make the circular motion with the capture device.

The interface 1300 may also include a user motion indicator icon 1302. The user motion indicator icon 1302 may illustrate to the user the motion that the user is actually making. For example, if the user is forming more of a square or cube shaped motion with the capture device, the capture device may inform the user via the motion of the user motion indicator icon 1302 on the display. The user is, thus, able to correct the motion of the capture device such that the movement of the user motion indicator icon 1302 on the display matches the motion indicator icon 1302. The interface 1300 may also include a video or other instructions, generally indicated by 1306, illustrating to the user how to perform the desired motion indicated by the motion indicator 1302.

Figure 14:
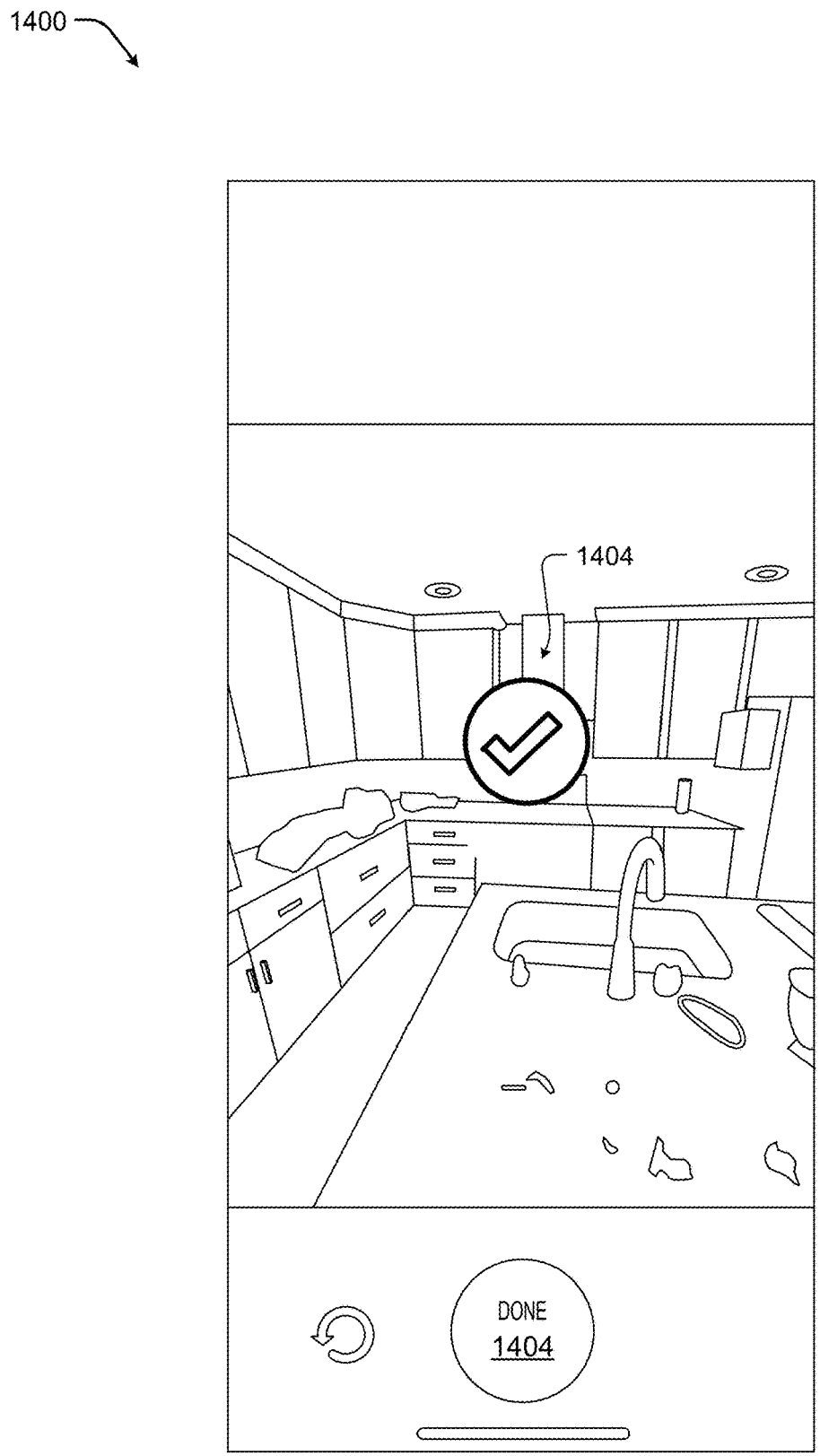
FIG. 14 is another example user interface associated with the initialization process according to some implementations.

FIG. 14 is another example user interface 1400 associated with the initialization process according to some implementations. In the current example, the display of the capture device may include an icon 1402 (this is labeled as 1404 on the PDF) indicating that the scale operations are complete, and the user may commence scanning, such as by selecting the button 1404.

Figure 15:
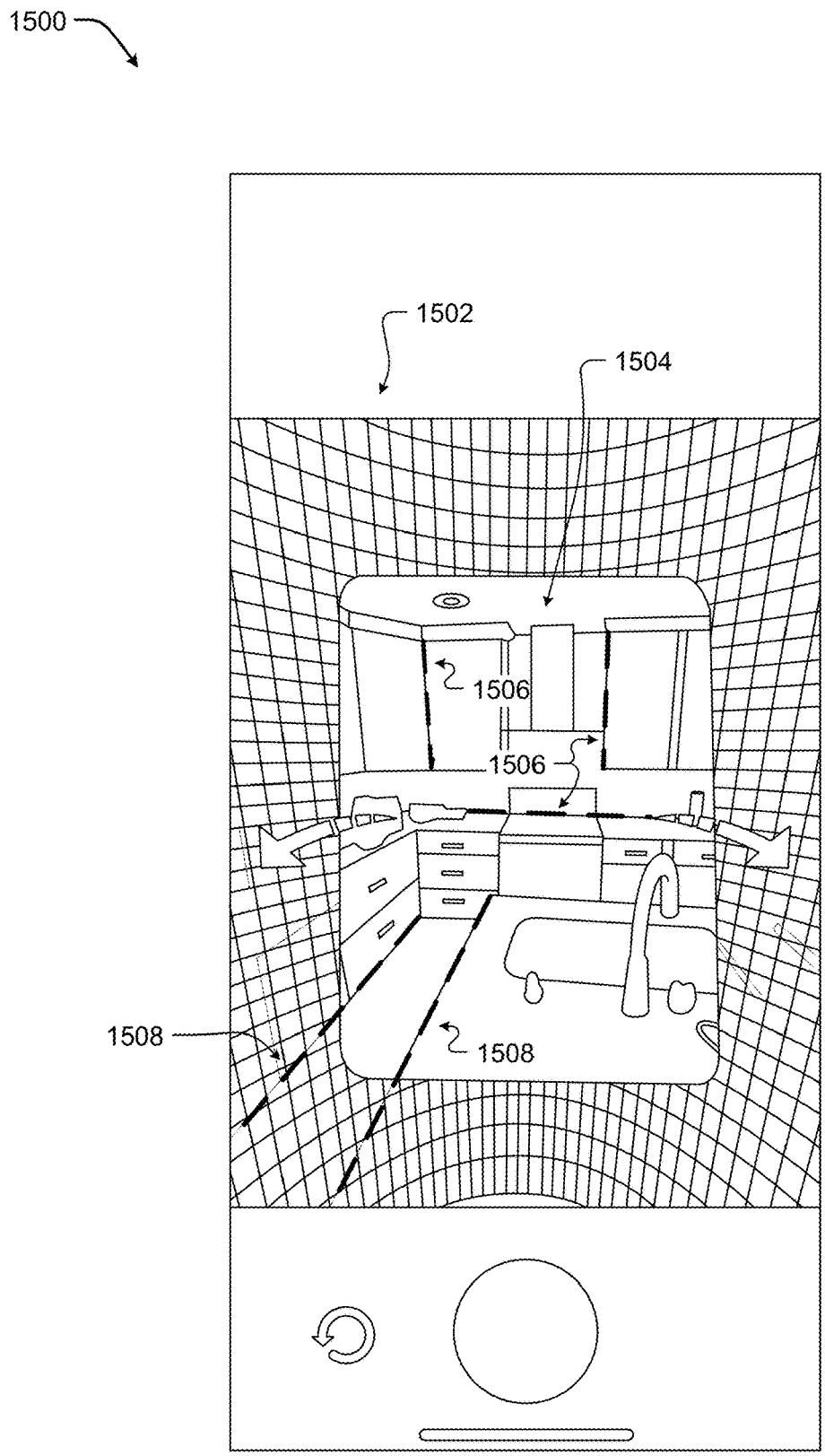
FIG. 15 is an example user interface associated with the scanning process according to some implementations.

FIG. 15 is an example user interface 1500 associated with the scanning process according to some implementations. In the current example, the display of the capture device may include an opaque portion 1502 indicating an unscanned portion of the physical environment and a completed portion 1504 indicating a scanned portion of the environment. As discussed above, the completed portion may be represented by image data captured during the scanning process. In one specific example, the user interface 1500 may display the image data currently visible within the field of the view of the image capture component together with the previously completed portion 1504. For instance, the field of view of the image capture component may be used to filter or cut off the completed portion (e.g., the user always sees the field of view even when the scan is complete).

In some examples, the capture device may include lines and/or points that have been detected. For example, in this example, the capture device may have detected lines 1506 and 1508. The detected lines 1506 and 1508 may be edges, corners, and the like. In some cases, the lines, such as lines 1508, may extend or be projected past the edge of the completed portion 1504. The lines and/or points, such as lines 1506 and 1508 may be tracked lines or points. In some cases, a color or feature of the line (e.g., thickness, pattern, or the like) may be used by the capture device to indicate to the user a confidence of the depth, position, and/or distance of the line from the capture position. For example, the lines 1506 and 1508 may be green if the confidence of the placement is greater than or equal to a first threshold, yellow if the confidence is between the first threshold and a second threshold, and/or red if the confidence is less than or equal to the second threshold.

Figure 16:
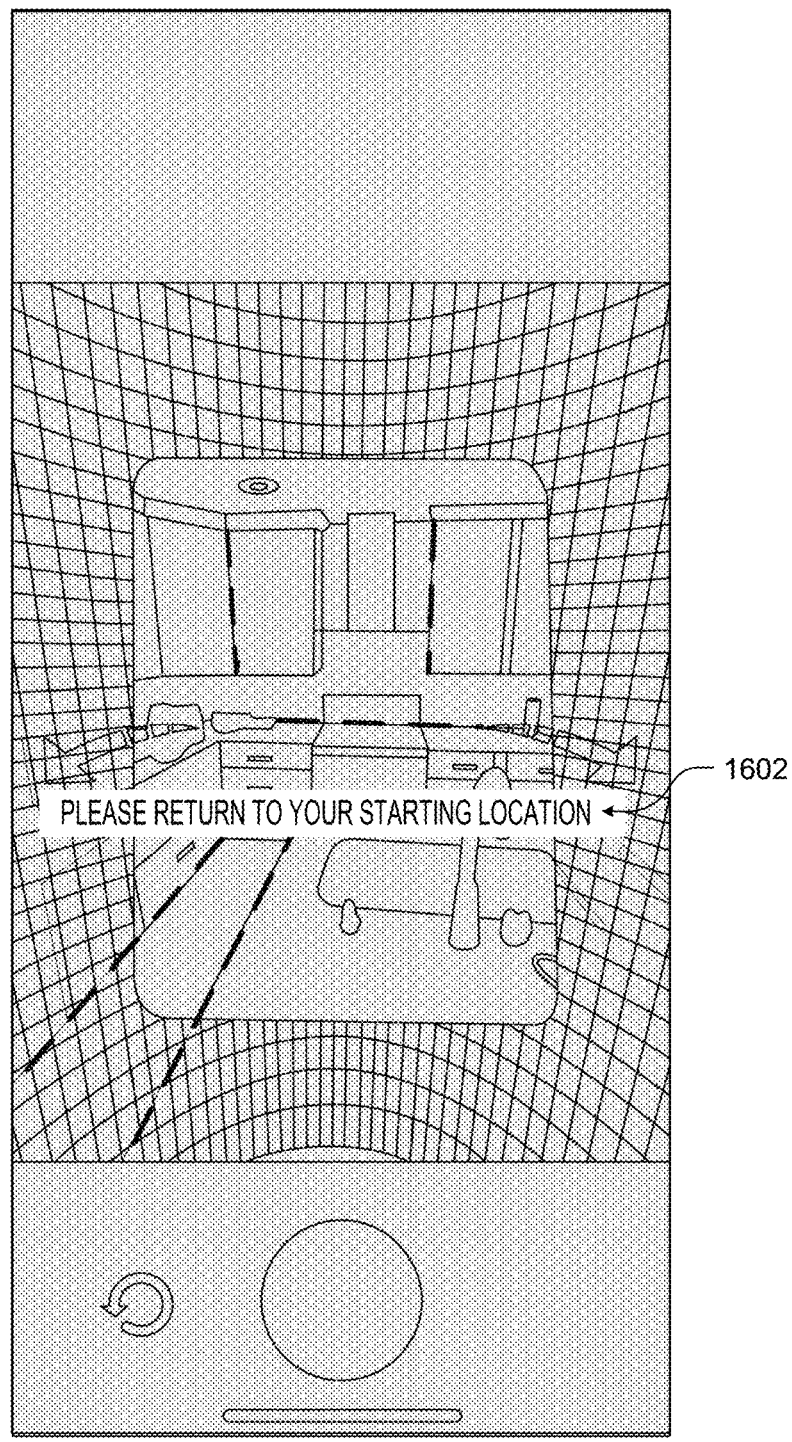
FIG. 16 is an example user interface associated with the scanning process according to some implementations.

FIG. 16 is an example user interface 1600 associated with the scanning process according to some implementations. In some examples, the capture position may induce a designated area about the scan starting location. In some instance, if the capture device, such as based on the orientation and motion data or output of the SLAM operations, determines the user and/or capture device has moved greater than or equal to a distance threshold from the starting location, the capture device may dim or darken the display and present a message or instructions 1602 for the user to return to the original capture location. In some cases, while the display is dimmed, the capture device may disable the image capture component and halt updating the scan and/or completing the opaque portion 1602.

Figure 17:
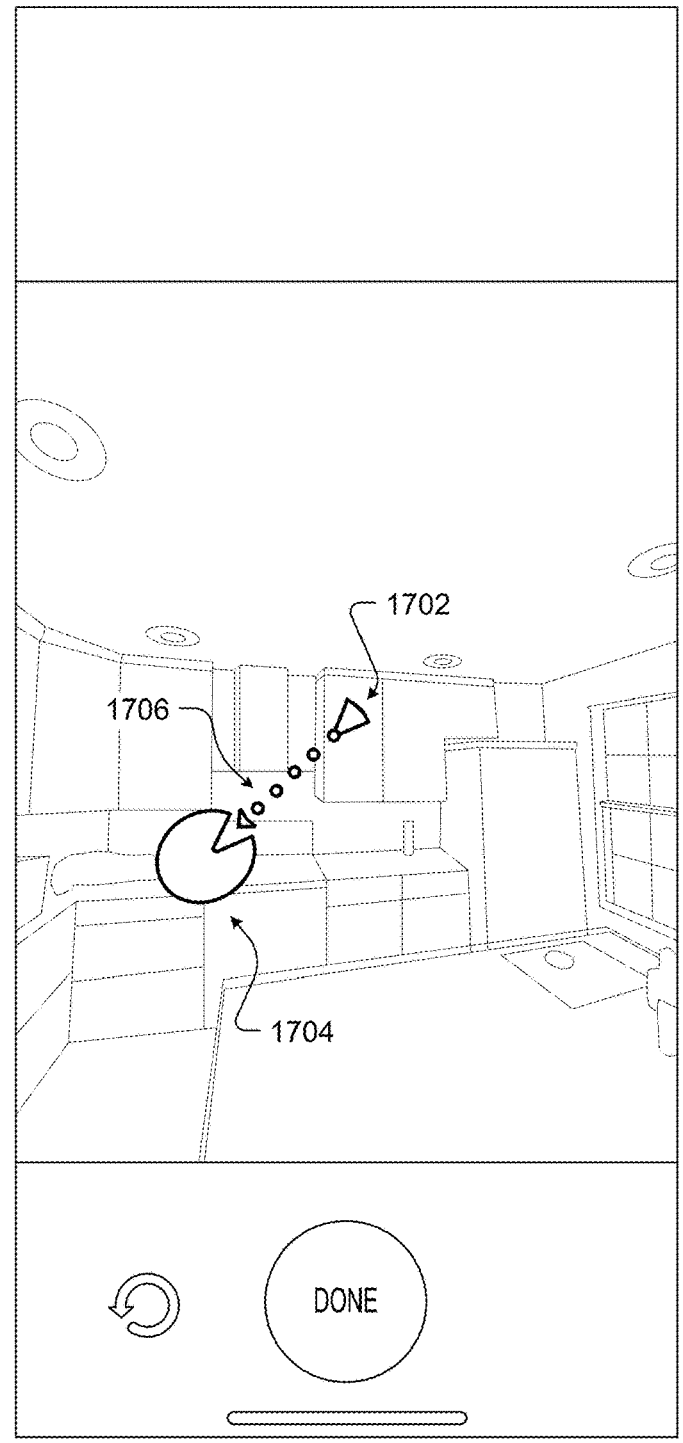
FIG. 17 is an example user interface associated with the loop closure process according to some implementations.

FIG. 17 is an example user interface 1700 associated with the loop closure process according to some implementations. In the current example, the display of the capture device may include a position icon 1702 indicating a current position of the capture device and a target icon 1704 indicating a desired position of the capture device. The display may also include a motion indicator icon 1706 illustrating to the user to perform the motion to align the position icon 1702 with the target icon 1704. In some examples, the display may present a sequence of target icons 1704 to cause the user to sequentially align the position icon 1702 with each of the target icons 1704. In other example, multiple target icons 1704 may be presented concurrently on the display to cause the user to align the position icon 1702 with each of the target icons 1704 in an order determined by the user. In one specific example, the target icons 1704 may include an ordering such as numerical or alphabetic to cause the user to align the position icon 1702 with each target icon 1704 in a prescribed order.

While FIGS. 1-17 are shown as different implementations, it should be understood that the features of FIGS. 1-17 may be applicable to any of the implementations illustrated. For example, the processes of FIGS. 4-9 and/or interfaces of FIGS. 10-17 may be each be used in part or in full by a capture device.

Although the subject matter has been described in language specific to structural features, it is to be understood that the subject matter defined in the appended claims is not necessarily limited to the specific features described. Rather, the specific features are disclosed as illustrative forms of implementing the claims.

What is claimed is:

1. A method comprising:
   presenting a first visual feature on a display of a user device, the first visual feature indicating a start position for a scanning operation to be performed at least in part by the user device and associated with a physical environment;
   responsive to starting an initialization operation, presenting a second visual feature on the display, the second visual feature indicating a desired motion for the user device during the initialization operation; and
   responsive to completion of the initialization operation, presenting a third visual feature on the display, the third visual feature indicating the user device is ready to perform a scan of the physical environment.

2. The method as recited in claim 1, wherein the initialization operation is associated with an initialization of a scale determining operation.

3. The method as recited in claim 2, further comprising displaying a fourth visual feature, the fourth visual feature indicating a progress associated with the scale determining operation.

4. The method as recited in claim 1, wherein the initialization operation is associated with an initialization of a simultaneous localization and mapping operation.

5. The method as recited in claim 4, wherein the initialization of a simultaneous localization and mapping operation further comprises:
   capturing data captured by sensors of the user device during the desired motion; and
   initializing the simultaneous localization and mapping operation based at least in part on the data.

6. The method as recited in claim 4, further comprising initializing the scanning operation is responsive to initializing the simultaneous localization and mapping operation.

7. The method as recited in claim 1, wherein the third visual feature is a user selectable visual feature to start the scanning operation; and
   responsive to receiving a selection of the user selectable visual feature, initiating the scanning operation.

8. The method as recited in claim 1, wherein the desired motion for the user device is at least one of a substantially circular-like, substantially elliptical-like, or a substantially figure-eight-like motion.

9. The method as recited in claim 1, wherein the desired motion for the user device during the initialization operation is a substantially translation-like motion.

10. The method as recited in claim 1, further comprising:
    initializing the scanning operation:
    presenting a scene having a first visual indication on the display, the first visual indication representing that a first area of the scene has not been scanned;
    receiving image data associated with the physical environment; and
    replacing, on the display, a portion of the first visual indication with a second visual indication, the portion corresponding to at least a portion of the physical environment associated with the image data and the second visual indication representing that a second area of the scene has been scanned.

11. A method comprising:
    responsive to starting a scanning operation associated with a physical environment to be performed at least in part by a user device:
    presenting a scene having a first visual indication on a display of the user device, the first visual indication representing that a first area of the scene has not been scanned;
    receiving image data associated with the physical environment; and
    replacing, on the display, a portion of the first visual indication with a second visual indication, the portion corresponding to at least a portion of the physical environment associated with the image data and the second visual indication representing that a second area of the scene has been scanned.

12. The method as recited in claim 11, wherein the second visual indication is at least a portion of the image data associated with the physical environment.

13. The method as recited in claim 11, further comprising:
    during the scanning operation, detecting a feature associated with the physical environment based at least in part on the image data and presenting the feature on the display over the image data, the feature including at least one of a line, point, or corner.

14. The method as recited in claim 13, wherein a color of the feature indicates a confidence associated with the detection.

15. The method as recited in claim 11, wherein the image data includes depth data.

16. The method as recited in claim 11, further comprising:
    presenting a first visual feature on a display of the user device, the first visual feature indicating a start position for the scanning operation to be performed; and
    responsive to detecting a motion of the user device exiting a designated area, the designated area associated with the start position, halting the scanning operation and displaying a second visual feature over with the scene, the second visual feature indicating instructions to return to the start position.

17. The method as recited in claim 11, further comprising generating a three-dimensional model of the physical environment based at least in part on the image data.

18. A method comprising:
    responsive to starting an initialization operation, presenting a second visual feature on a display of a user device, the second visual feature indicating a desired motion for the user device during the initialization operation;

responsive to starting a scale determining operation, presenting a third visual feature on the display, the third visual feature indicating a desired motion for the user device during the scale determining operation; and responsive to starting a scanning operation:
presenting a scene having a first visual indication on the display, the first visual indication representing that a first area of the scene has not been scanned;
receiving image data associated with a physical environment; and
replacing, on the display, a portion of the first visual indication with a second visual indication, the portion corresponding to at least a portion of the physical environment associated with the image data and the second visual indication representing that a second area of the scene has been scanned.

19. The method as recited in claim 18, further comprising displaying a fourth visual feature concurrently with the scene, the fourth visual feature indicating a desired motion of the user device during the scanning operation.

20. The method as recited in claim 18, further comprising:
responsive to detecting a motion of the user device exiting a designated area, the designated area associated with a capture position, displaying halting the scanning operation and displaying a fourth visual feature over with the scene, the fourth visual feature indicating instructions to return to the designated area.

* * * * *